United States Patent Office 2,971,405
Patented Feb. 14, 1961

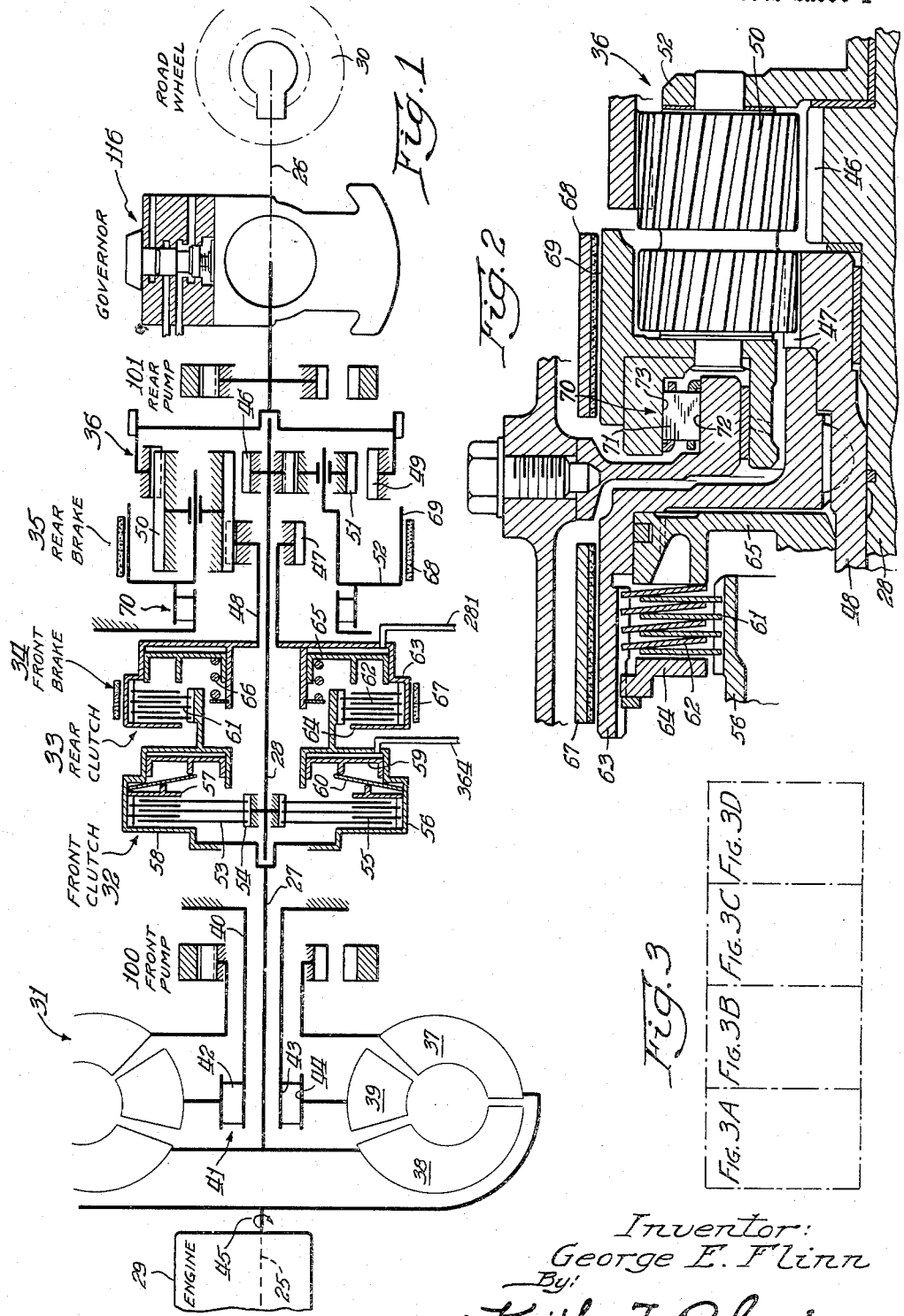

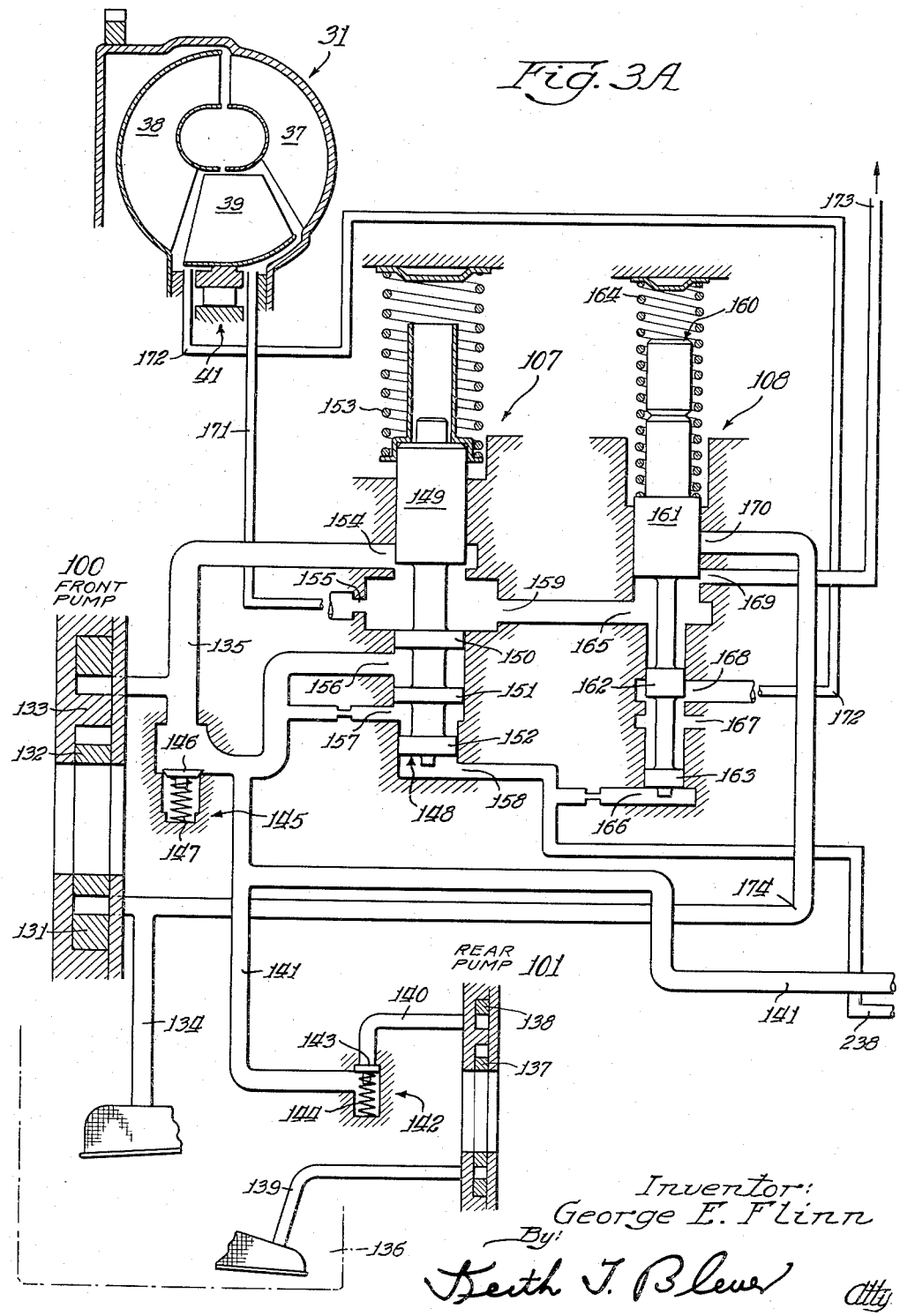

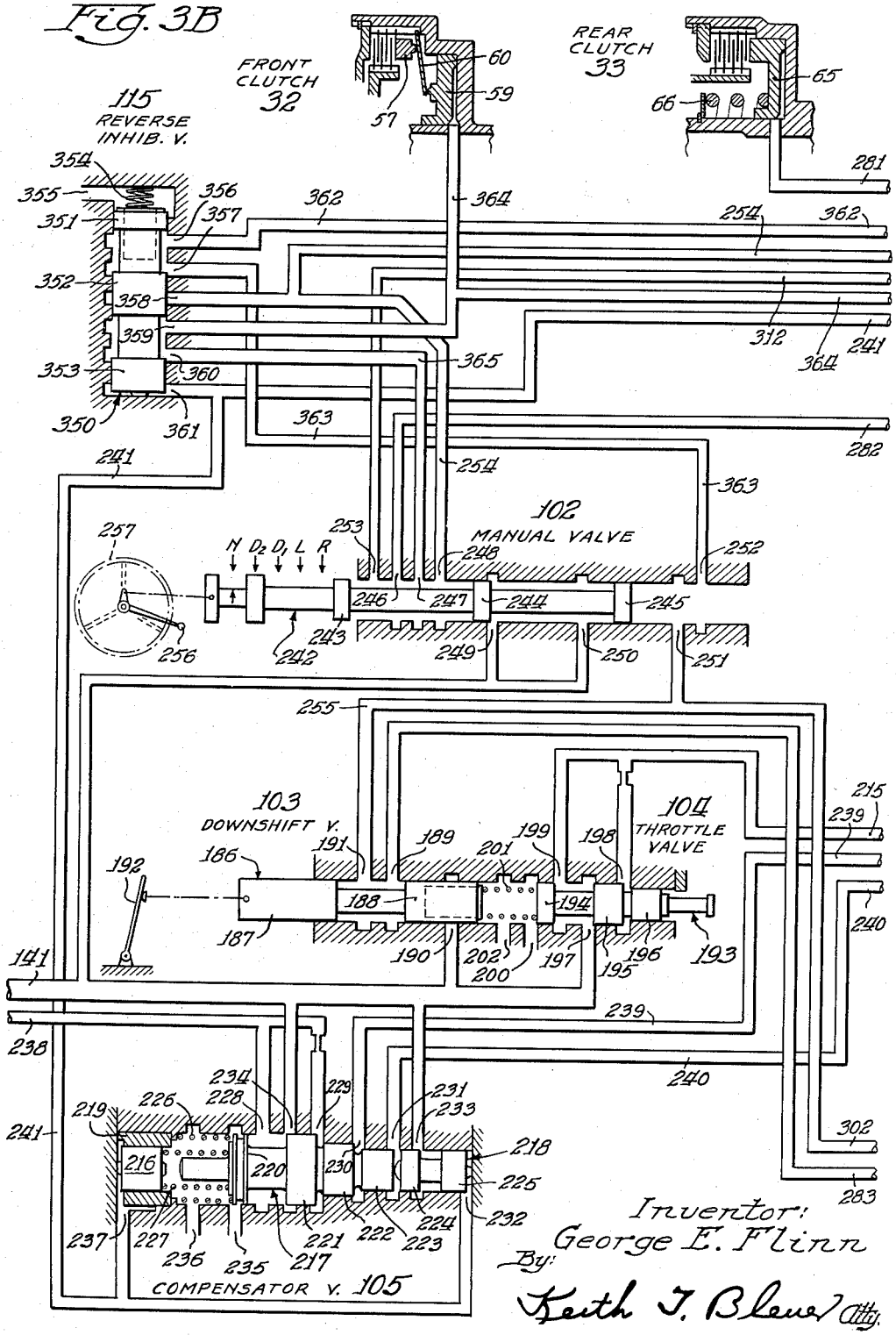

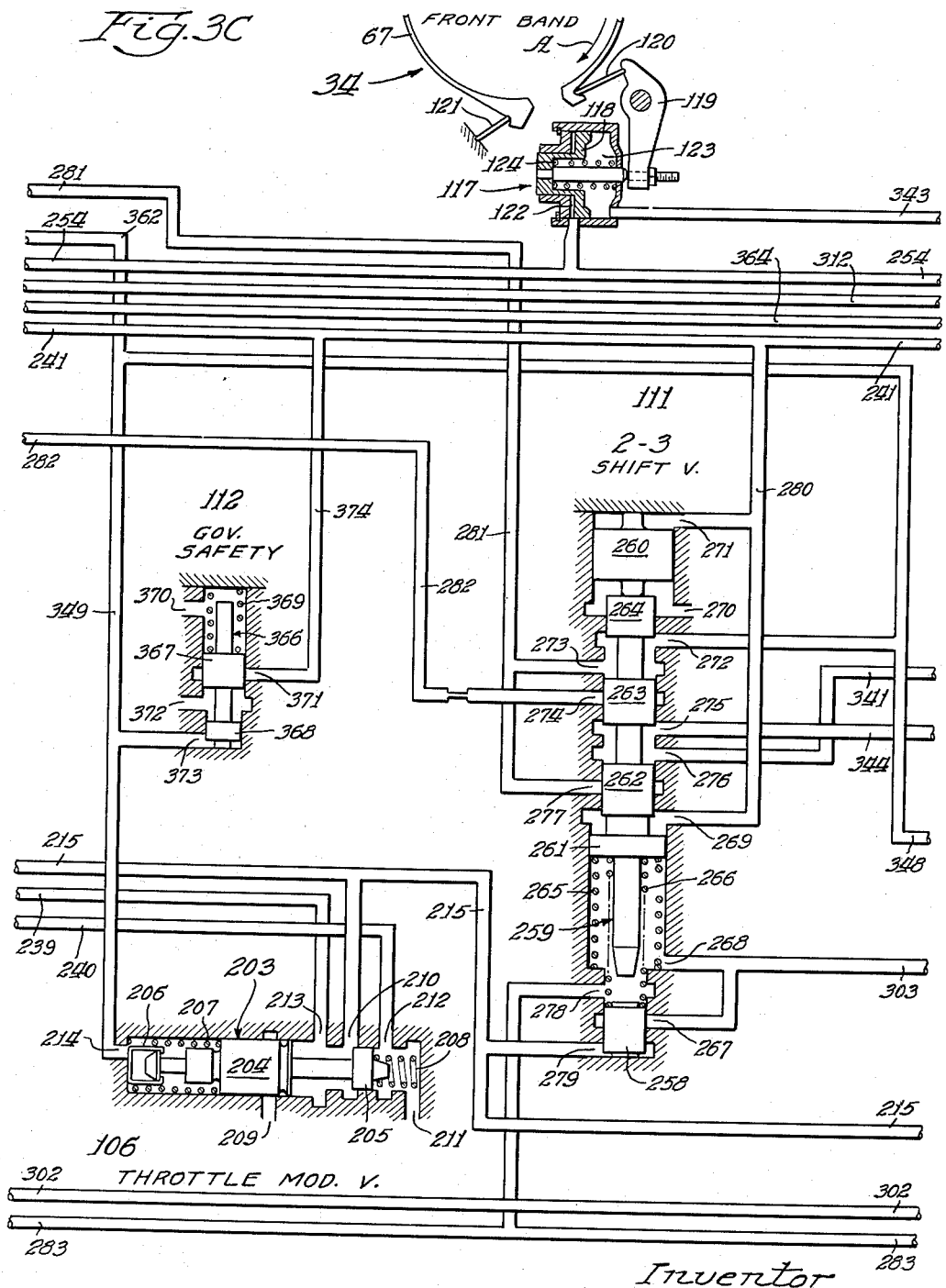

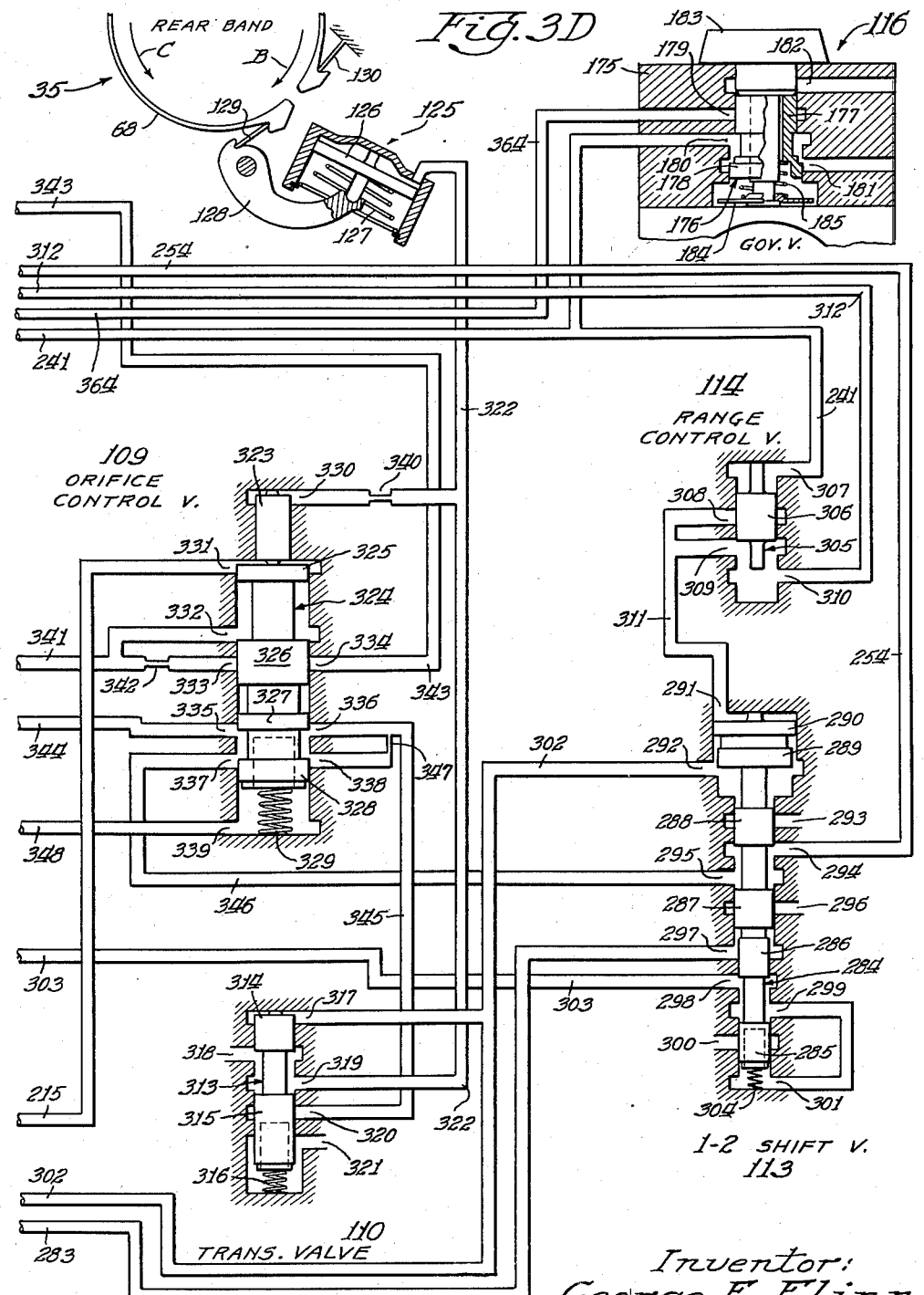

2,971,405

HYDRAULIC CONTROLS FOR TRANSMISSION

George E. Flinn, Muncie, Ind., assignor to Borg-Warner Corporation, Chicago, Ill., a corporation of Illinois Filed Dec. 31, 1956, Ser. No. 631,929

13 Claims. (Cl. 74—752)

My invention relates to transmission for automotive vehicles and more particularly to hydraulic controlling mechanisms for such transmissions.

Automatic transmission controlling mechanisms generally include a manual selector valve which has forward and reverse drive positions respectively completing forward and reverse drives through the transmission in these positions. Such a selector could, through mistake of the vehicle operator, be put in a reverse drive position during forward driving at high speeds, and this could result in breakage of parts of the transmission.

It is accordingly an object of the present invention to provide mechanism under the control of the vehicle speed which prevents a completion of a reverse power drive train when the vehicle is travelling above a certain speed in the forward direction, even though the manual selector is moved into its reverse drive position. More particularly, it is an object of the present invention to provide such overruling mechanism which, when the manual selector is moved into its reverse drive position, causes a down-shifting of the transmission first into an intermediate speed drive and then subsequently into a low speed drive as the vehicle speed decreases. When a predetermined low forward speed of the vehicle is reached, at this time the overruling mechanism becomes inoperative and the reverse drive power train is completed.

It is contemplated that the manual selector may have a plurality of forward drive positions, one of which is a so-called low range position which causes the transmission to be downshifted into its lower speed ratios, and it is a more particular object to provide valving under the control of the speed of the driven shaft of the transmission which makes, in effect, the low range position of the selector operative even though the selector is actually shifted into its reverse drive position when the vehicle is travelling forwardly above a certain predetermined speed.

Such speed responsive valving is preferably under the control of a hydraulic governor driven by the driven shaft of the transmission providing an output pressure that increases with driven shaft speed. It is another object of the invention to provide safety valving under the control of pressures derived from the overruling valving mentioned above for draining the output conduit of the hydraulic governor and thus assuring that no output governor pressure can exist when the overruling valving is in its inoperative position allowing completion of the reverse drive power train.

It is another object of the invention to provide a three-speed forward drive transmission with a free-wheeling brake for an element of a planetary gearing system that completes a drive from the drive shaft to the driven shaft in a low speed forward drive and to provide a friction brake for the same element of the transmission as that on which the one-way brake is effective for providing for the completion of the low speed forward drive for both directions of drive. It is also an object of the invention to provide hydraulic controls for such a transmission which has a manual selector with a drive range providing for shifts from low to an intermediate speed drive with the one-way brake being effective, exclusive of the friction brake, for the low speed drive, so that a smooth shift from low to intermediate speed drive is obtained with the free-wheeling brake releasing automatically and with no timed overlap of shifts being necessary. It is contemplated that the manual selector shall also have a low range position in which the intermediate and low speed drives are effective, and it is an object to so arrange the controls that the friction brake is effective for providing a two-way low speed drive for this low range operation.

The invention consists of the novel constructions, arrangements and devices to be hereinafter described and claimed for carrying out the above stated objects and such other objects as will be apparent from the following description of a preferred embodiment of the invention illustrated with reference to the accompanying drawings, wherein:

Fig. 1 is a diagrammatic illustration of a transmission with which my improved hydraulic controls may be used;

Fig. 2 is a sectional view of a one-way brake mechanism in the transmission and taken on line 2—2 of Fig. 1;

Fig. 3 is a diagram showing the manner in which Figs. 3A, 3B, 3C and 3D shall be placed with respect to each other to form a complete showing of my improved transmission controls; and Figs. 3A, 3B, 3C and 3D are respectively diagrammatic illustrations of parts of my improved hydraulic transmission controls which shall be placed together in the manner illustrated in Fig. 3.

Like characters of reference designate like parts in the several views.

The transmission with which my improved hydraulic controls are adapted to cooperate may be seen in Fig .1 to comprise a drive shaft 25, a driven shaft 26, and intermediate shafts 27 and 28. The shaft 25 may be the usual crank shaft of the engine 29 of the vehicle, and the shaft 26 may be connected with the usual driving road wheels 30 of the vehicle by any suitable well-known power transmitting mechanism. The shafts 27 and 28 are in effect piloted with respect to the shafts 25 and 26. The transmission comprises in general a hydraulic torque converter 31, hydraulically operated friction clutches 32 and 33, hydraulically operated friction brakes 34 and 35 and a planetary gear set 36.

The hydrauliic torque converter 31 comprises a vaned impeller element 37, a vaned rotor or driven element 38, and a vaned stator or reaction element 39. The impeller 37 is driven from the drive shaft 25, and the rotor 38 is fixed to the intermediate shaft 27. The stator 39 is rotatably disposed on a stationary sleeve 40, and a one-way brake 41 is disposed between the stator and the sleeve 40. The one-way brake 41 may be of any suitable construction, and, in the illustrated embodiment, comprises a plurality of tiltable sprags 42 disposed between an inner race surface 43 fixed with respect to the sleeve 40 and an outer race surface 44 fixed with respect to the stator 39. The one-way brake 41 is so arranged as to allow a free rotation of the stator 39 in the forward direction, that is, in the same direction in which the drive shaft rotates and which is indicated by the arrow 45 and prevents a rotation of the stator in the reverse direction.

The torque converter 31 functions in a manner well-known for such torque converters for driving the rotor or driven element 38 at an increased torque with respect to the torque impressed on the impeller 37 of the converter. The vanes of the stator 39 function to change the direction of flow of fluid between the rotor and impeller so as to provide this increased torque on the driven element 38. In this case, the reaction on the stator 39 is in the direction reverse to the direction of rotation of the drive shaft 25, so that the one-way brake 41 engages and prevents rotation of the stator in this direction. When the speed of the rotor 38 reaches a predetermined value, the reaction of the stator vanes 39 changes in direction, tending to rotate the stator in the forward direction; and the brake 41 releases and allows such rotation of the stator. In this case, the torque converter 31 functions as a simple fluid coupling which drives the rotor 38 at substantially the same speed and with no increase in torque with respect to the impeller 37.

The planetary gear set 36 comprises a sun gear 46 which is fixed on the shaft 28, a second sun gear 47 fixed on a sleeve portion 48 which is rotatable on the shaft 28, a ring gear 49 fixed with respect to the driven shaft 26, a plurality of planet gears 50, a plurality of planet gears 51 and a planet gear carrier 52. Each planet gear 50 and each of the planet gears 51 is rotatably disposed on and is carried by the carrier 52. The carrier 52 is rotatably disposed with respect to the shaft 28 and the shaft portion 48 by any suitable bearings. The planet gears 51 are each in mesh with the sun gear 46 and also with a planet gear 50. The gears 50 are also in mesh with the ring gear 49 and with the sun gear 47.

The clutch 32 is arranged to connect the shaft 27 driven by the rotor 38 with the shaft 28 and the sun gear 46 fixed thereon. The clutch 32 comprises clutch discs 53 splined on a hub member 54 which is fixed on the shaft 28. The clutch also comprises clutch discs 55 interleaved between the discs 53 and fixed within a member 56, that is, in turn fixed to the shaft 27 so as to be driven by this shaft.

The clutch 32 comprises a movable pressure plate 57 splined within the member 56 and adapted to press the friction discs 53 and 55 together in frictional engagement between it and an enlarged annular part 58 of the shaft 27. An annular piston 59 is provided for actuating the movable pressure plate 57. The pressure from the piston 59 is transmitted to the pressure plate 57 through a spring strut 60 which is in the form of an annular Belleville washer. The strut 60 at its inner periphery is acted on by the piston 59 so that its inner periphery moves axially with respect to its outer periphery and moves the pressure plate 57 which is acted on by the strut 60 at intermediate points thereof. The inherent resilient action of the strut 60 functions to return the piston 59 back into its illustrated position when fluid pressure, applied as will be hereinafter described, is released from the piston.

The clutch 33 is arranged to connect the part 56 and thereby the shaft 27 with the shaft portion 48 and the sun gear 47 and comprises clutch discs 61 splined onto the member 56 and clutch discs 62 splined within a member 63 which is fixed to the shaft portion 48. A pressure plate portion 64 is fixed to the member 63 on one side of the clutch discs, and an annular hydraulic piston 65 is provided on the other side of the discs for compressing the discs between it and the pressure plate portion 64. A return spring 66 is provided for acting on the piston 65 and yieldably holding it in its clutch disapplying position.

The brake 34 comprises a brake band 67 adapted to be contracted on the part 63 for thereby braking the sun gear 47. The brake 35 comprises a brake band 68 adapted to be contracted on a drum portion 69 of the planet gear carrier 52.

A one-way brake 70 is provided for the planet gear carrier 52. The one-way brake 70 may be of any suitable construction, and, in the illustrated embodiment, comprises a plurality of tiltable sprags 71 disposed between an inner race surface 72 and an outer race surface 73. The sprags are disposed to so tilt between the race surfaces 72 and 73 that the carrier 52 is held from rotation in the reverse direction, that is, in a direction reverse to that indicated by the arrow 45.

In operation, the transmission has a neutral condition and provides low, intermediate and high speed ratios in forward drive and a drive in reverse. The transmission is in neutral condition when the clutches 32 and 33 and the brakes 34 and 35 are disengaged.

Low speed forward drive may be obtained by engaging the clutch 32 by applying fluid pressure to the piston 59. The low speed power train exists from the drive shaft 25 through the torque converter 31, the intermediate shaft 27, the clutch 32, the shaft 28 and the planetary gear set 36 to the shaft 26. For this drive, the reaction on the planet gear carrier 52, or the tendency of the carrier 52 to rotate, is in the reverse direction; and the one-way brake 70 is effective to prevent such rotation of the carrier 52 so that the carrier 52 is held stationary and thus constitutes the reaction element of the gear set 36. The shaft 28, driven as just described, drives the sun gear 46 which constitutes the driving element of the gear set 36. The drive is transmitted through the planet gears 50 and 51 from the sun gear 46 to the ring gear 49, thus driving the shaft 26 at a reduced speed with respect to the shaft 28. Torque conversion takes place in both the hydraulic torque converter 31 and also in the gear set 36, so that the torque with which the shaft 26 is driven is the product of the individual torque multiplications of the hydraulic torque converter 31 and the gear set 36. It will be understood, as above described, however, that the torque conversion produced by the hydraulic torque converter 31 decreases as the speed of the driven element 38 increases, and eventually the torque converter 31 functions as a simple fluid coupling producing no torque conversion within it. This drive, as will be understood, is a one-way free-wheeling drive, since the one-way brake 70 is effective, to complete the drive, and assuming the vehicle tends to coast, the one-way brake 70 will release to break the power train.

For a two-way low speed drive, the brake 35 may also be engaged for the purpose of braking the carrier 52. For a drive from the drive shaft 25 to the driven shaft 26, the results are no different for low speed drive than just described; however, when the drive reverses, to be from the driven shaft 26 to the drive shaft 25, as for example, when the vehicle coasts against the engine 29, the reaction on the carrier 52 changes in direction, and under these conditions, the one-way brake 70 releases. The brake 35, when applied, prevents unrestrained rotation of the carrier 52 in the forward direction and thus maintains the low speed power train completed under coasting conditions of the vehicle.

The intermediate speed power train is completed by allowing the clutch 32 to remain engaged and engaging the brake 34. If the brake 35 is engaged for low speed drive, the brake 35 is disengaged in order to provide for a completion of the intermediate speed power train. On completion of the intermediate speed power train, the one-way brake 70 automatically disengages, the carrier 52 rotating in the forward direction when the intermediate speed power train is operative, and the change between drives is thus quite smooth as the one-way brake 70 automatically breaks the low speed drive at the proper time during the ratio shift. The flow of power for the intermediate speed power train is the same as for the low speed power train; however, for the intermediate speed power train, the sun gear 47 is the reaction element of the gear set 36 rather than the carrier 52, the gear 47 for the intermediate speed drive being held stationary by the brake 34. Since there are sets of two planet gears 50 and 51 between the sun gear 46 and the ring gear 49 and since the sun gear 47 is in mesh with the gears 50, the ring gear 49 and thereby the shaft 26 are driven at a reduced speed with respect to the shaft 28 which is, however, higher than for the low speed drive.

The high speed power train is obtained by allowing the clutch 32 to remain engaged and engaging the clutch 33 in lieu of the brake 34. The clutch 33 may be engaged by applying fluid pressure to its piston 65. In this drive, the shaft 27 is driven through the torque converter 31 from the drive shaft 25 as in intermediate speed drive. The shaft 27 is connected through the clutch 32 to drive the sun gear 46 as was the case in intermediate speed drive. The clutch 33 functions to connect part 56, which is connected to the shaft 27, with the part 63 and thereby with the sun gear 47. Thus, both the sun gear 46 and also the sun gear 47 are driven by the shaft 27, and as is well-known in connection with planetary gear sets, when two elements of the gear set are driven at the same speed, the gear set becomes locked up so that all of its gears and elements rotate as a unit. There is thus a direct drive between the shafts 27 and 26. The converter 31 may be expected to function as a simple fluid coupling, generally, in this drive; and there thus exists a substantially direct drive between the drive shaft 25 of the transmission and its driven shaft 26.

Reverse drive may be obtained through the transmission by engaging the brake 35 and the clutch 33. The power train for this drive is from the drive shaft 25 through the torque converter 31, the intermediate shaft 27, the clutch 33, the sun gear 47, the planet gear 50 and the ring gear 49 to the driven shaft 26. The brake 35 causes the planet gear carrier 52 to function as the reaction element of the gear set; and in this case, the reaction on the carrier 52 is in the forward direction, that is, the carrier 52 tends to rotate forwardly, so that the one-way brake 70 is not effective. Since there are only the single planet gears 50 between the sun gear 47 which drives and the ring gear 49 which is driven, the ring gear 49 and the shaft 26 will be driven at a reduced speed in the reverse direction with respect to the shaft 27. For this drive, the torque converter 31 generally functions to increase torque; and thus the torque impressed on the shaft 26 is the product of the torque increases by the torque converter 31 and the planetary gear set 36.

It is believed that the construction of the transmission will be apparent from the diagrammatic illustration in Fig. 1 and the cross sectional view of the one-way brake 70 in Fig. 2 and that a person skilled in the art can supply the various detailed parts, such as bearings, to build an actual device; however, for an actual illustration of such detailed parts, the copending application of Robert W. Wayman, Serial No. 166,136, filed June 5, 1950, which discloses a similar transmission, except for the one-way brake 70, may be referred to.

The hydraulic control system for the transmission comprises, in general, a front pump 100, a rear pump 101, a manual valve 102, a downshift valve 103, a throttle valve 104, a compensator valve 105, a throttle modulator valve 106, a main oil pressure regulator valve 107, a low oil pressure regulator valve 108, an orifice control valve 109, a transition valve 110, a 2–3 shift valve 111, a governor safety valve 112, a 1–2 shift valve 113, a range control valve 114, a reverse inhibitor valve 115 and a governor valve 116.

The brake 34 is applied by means of a hydraulic motor 117. The motor 117 comprises a piston 118 connected by means of a bell crank 119 and a strut 120 with one end of the brake band 67, the other end of the brake band 67 being held fixed by means of a strut 121. The motor 117 has a brake applying fluid pressure cavity 122 and a brake disapplying fluid pressure cavity 123, and a spring 124 acts on the piston 118 tending to hold it in its brake disapplying position. Fluid pressure supplied to the cavity 122 moves the piston 118 against the spring 124 so as to move one end of the brake band 67 to engage it with the drum 63. It may be noted at this point that the direction of reaction on the sun gear 47 and the drum 63 is in the reverse direction as indicated by the arrow A when the brake 34 is engaged for the intermediate speed ratio power train. This direction is opposite the direction of rotation of the drive shaft 25 indicated by the arrow 45; and the drum 63, in tending to rotate in this direction, augments the action of the strut 120 in engaging the band 67 and causes increased band engagement, since the drum 63 tends to carry the end of the band acted on by the strut 120 in the same direction in which this end of the band is urged by the strut 120. It is apparent that the band 67 wraps or is partially self-energizing for this rotative tendency of the drum 63.

The brake 35 is engaged by means of a fluid pressure motor 125 which comprises a piston 126 movable by fluid pressure applied thereto against the action of a spring 127. Motion of the piston 126 is transmitted to one end of the brake band 68 by means of a bell crank 128 and a strut 129, the other end of the brake band 68 being held fixed by means of a strut 130. In low speed drive through the transmission, the reaction on the planet gear carrier 52 and on the drum 69 is in the reverse direction as indicated by the arrow B, and this reaction or tendency to rotate would tend to unwrap the band 68 with respect to the drum 69; however, the one-way brake 70 is so arranged as to hold the carrier 52 from such rotation in the reverse direction, and the holding ability of the brake 35 is not required, under these conditions. The reaction on the brake drum 69 for reverse drive is in the forward direction as indicated by the arrow C, that is, in the same direction as the drive shaft 25 rotates. The tendency of the drum 69 to rotate in this direction assists the strut 129 in forcing the movable end of the band 68 to move in the direction indicated by the arrow C, and the brake 35 thus wraps or is self-energizing for this direction of reaction, so that the braking effect is greater than would be the case if there were no tendency for the drum to rotate. The reaction on the drum 69 is greater for reverse drive than for low forward drive, and hence, the brake 35 has been constructed to wrap for the reaction for reverse drive instead of that for low speed forward drive, particularly since the one-way brake 70 takes the reaction for low speed forward drive.

The pump 100 may be of any suitable fixed displacement type and may comprise an outer gear 131 and an inner gear 132 and a crescent-shaped casing portion 133 between the gears. The gears 131 and 132 carry fluid between their teeth and across the inner and outer surfaces of the casing portion 133 so as to draw fluid from an inlet conduit 134 and discharge it into an outlet conduit 135. The inlet conduit 134 is adapted to draw fluid, such as oil, from a sump 136. The pump 100 is driven directly from the drive shaft 27 through the impeller 37. The pump 101 is of the same construction as the pump 100, having inner and outer gears 137 and 138 and is driven from the driven shaft 26 of the transmission. The pump 101 draws fluid from the sump 136 through an inlet conduit 139 and discharges it into an outlet conduit 140.

A conduit 141 constitutes the supply or line pressure conduit for engaging the power train completing friction clutches and brakes and also for supplying various valves in the transmission control system with fluid pressure. A check valve 142 is disposed between the conduits 140 and 141 and comprises a piston 143 yieldably held in its closed position by means of a spring 144. The check valve 142 blocks fluid flow from the conduit 141 to the conduit 140 and the rear pump 101.

A similar check valve 145 comprising a piston 146 and a spring 147 acting on the piston is provided between the line pressure conduit 141 and the outlet conduit 135 for the front pump 100. The check valve 145 functions to prevent fluid flow from the line pressure conduit 141 to the conduit 135 when the pressure in the latter conduit is lower than in the conduit 141.

The main pressure regulator valve 107 functions to regulate pressure in the line pressure conduit 141. The valve 107 comprises a piston 148 having lands 149, 150, 151 and 152. A spring 153 is provided for moving the piston 148 downwardly as seen in the figure. The valve 107 comprises ports 154, 155, 156, 157, 158 and 159. The ports 156 and 157 are connected with the line pressure conduit 141, and the port 154 is connected with the outlet conduit 135 of the pump 100. The ports 155 and 159 are permanently connected around the piston 148.

The valve 108 is a regulator valve for regulating the pressure within the hydraulic torque converter 31. The valve 108 comprises a valve piston 160 having lands 161, 162 and 163. A spring 164 is provided between the land 161 and a stationary part for yieldably holding the piston 160 downwardly. The valve 108 comprises ports 165, 166, 167, 168, 169 and 170. The port 165 is connected with the ports 159 and 155 which are in permanent connection around the valve piston 148 and also with the torque converter 31 through a torque converter inlet conduit 171; the port 166 is connected with the port 158 of the valve 107; the port 167 is a bleed port adapted to discharge into the sump 136; the port 168 is connected by means of a torque converter outlet conduit 172 with the torque converter 31; the port 169 is connected with a conduit 173 which supplies lubricating oil to any suitable parts of the transmission; and the port 170 is connected by means of a conduit 174 with the pump inlet conduit 134.

The governor valve 116 is for the purpose of providing a speed responsive fluid pressure for causing various ratio changes through the transmission. The governor valve 116 comprises a casing 175 which is fixed on the driven shaft 26 and a piston 176 slidably disposed in a cavity within the casing 175. The piston 176 is provided with lands 177 and 178. The governor valve 116 comprises ports 179, 180, 181 and 182. The ports 181 and 182 are bleed ports discharging into the sump 136. A governor weight 183 extends through and is slidably disposed within the governor piston 176. The weight 183 has a spring retainer washer 184 fixed on its inner end, and a spring 185 extends between the retainer washer 184 and an internal shoulder formed within the piston 176 for yieldably holding the weight 183 and the valve piston 176 together in the relative positions in which they are illustrated.

The throttle valve 104, the compensator valve 105 and the throttle modulator valve 106 provide pressures that vary with the position of the accelerator of the vehicle for varying the shift points of the transmission and also for varying the pressures that are applied to the various clutches and the brakes of the transmission. The throttle valve 104 is under the control of the downshift valve 103. The downshift valve 103 comprises a valve piston 186 having lands 187 and 188. The downshift valve 103 comprises ports 189, 190 and 191. The port 190 is connected with the line pressure supply conduit 141. The valve piston 186 is under the control of the vehicle accelerator 192 by any suitable connecting mechanism, so that when the accelerator 192 is moved toward an open throttle position, it coordinately moves the piston 186 to the right as seen in the drawing. It will be understood that the accelerator 192 has the usual connections with the carburetor of the vehicle engine 29.

The throttle valve 104 comprises a piston 193 having lands 194, 195 and 196. The valve 104 comprises ports 197, 198, 199 and 200. A spring 201 is provided between the valves 103 and 104. The port 197 is connected with the line pressure supply conduit 141; the port 198 which is relatively restricted is connected with the port 199; and the port 200 is a bleed port. A bleed port 202 is provided between the two valves 103 and 104.

The throttle modulator valve 106 comprises a piston 203 having lands 204 and 205. A sheet metal spring retainer 206 embraces an end of the piston 203 and a spring 207 is provided between the land 204 and the retainer 206. A spring 208 is provided between the land 205 and the adjacent end of the cavity in which the piston 203 is disposed. The valve 106 comprises ports 209, 210, 211, 212, 213 and 214. The ports 209 and 211 are bleed ports, and the port 210 is connected with a throttle pressure supply conduit 215 to which the ports 198 and 199 of the throttle valve 104 are also connected.

The compensator valve 105 comprises pistons 216, 217 and 218. The piston 216 constitutes a simple plug slidably disposed in a stationary sleeve 219. The piston 217 comprises lands 220, 221, 222 and 223. The piston 218 comprises lands 224 and 225. A spring 226 is disposed between the land 220 and the fixed sleeve 219, and a spring 227 is disposed between the land 220 and the movable plug 216.

The compensator valve 105 is provided with ports 228, 229, 230, 231, 232, 233, 234, 235, 236 and 237. The port 229, which is relatively restricted, and the port 228 are connected by means of a compensator pressure supply conduit 238 with the ports 158 and 166 of the pressure regulator valves 107 and 108; the port 230 is connected by means of a conduit 239 with the port 213 of the valve 106; the port 231 is connected by means of a conduit 240 with the port 212 of the valve 106; the port 232 is connected with a governor pressure supply conduit 241 that is also connected with the port 180 of the governor valve 116, the ports 233 and 234 are connected with the line pressure supply conduit 141; the ports 235 and 236 are bleed ports; and the port 237 is also connected with the governor pressure supply conduit 241.

The various ranges of operation of the transmission are under the control of the manual valve 102. The valve 102 comprises a valve piston 242 having lands 243, 244 and 245. The valve is provided with ports 246, 247, 248, 249, 250, 251, 252 and 253. The port 248 is connected by means of a conduit 254 with the piston 118, particularly with the cavity 122 on one side of the piston; the ports 249 and 250 are connected with the line pressure supply conduit 141; and the port 251 is connected by means of a conduit 255 with the port 191 of the downshift valve 103. The manual valve piston 242 is controlled from the driver's compartment by means of a selector lever 256 located directly beneath the vehicle steering wheel 257, the selector lever being connected by any suitable connecting mechanism with the piston 242 so that the piston 242 can be moved into any of its principal positions which are N, D2, D1, L and R corresponding to neutral, high drive range with the start in intermediate, high drive range with the start in low, low range and reverse drive, respectively.

The 2–3 shift valve 111 causes engagement and disengagement of the proper clutch and brake (clutch 33 and brake 34) for causing changes between second and third speed drives. The valve 111 comprises pistons 258, 259 and 260. The piston 258 is a simple plug. The piston 259 is provided with lands 261, 262, 263 and 264. A spring 265 is disposed between the land 261 and a stationary part for urging the piston 259 upwardly as seen in the drawing, and a spring 266 is provided between the land 261 and the piston 258. The piston 260 is also a simple plug. The valve 111 is provided with ports 267, 268, 269, 270, 271, 272, 273, 274, 275, 276, 277, 278 and 279. The ports 267 and 268 are connected together; the ports 269 and 271 are connected by means of a branch conduit 280 with the governor pressure conduit 241; the port 270 is a bleed port; the ports 273 and 277 are connected by means of a conduit 281 with the piston 65 for the rear clutch 33; the port 274 is connected by means of a conduit 282 with the port 246 of the manual valve 102; the port 278 is connected by means of a conduit 283 with the port 189 of the downshift valve 103; and the port 279 is connected with the conduit 215 that is connected to the ports 199 and 198 of the throttle valve 104.

The 1–2 shift valve 113 causes engagement and disengagement of the brakes 34 and 35 for causing changes between the first and the second speed drives. The valve 113 comprises a valve piston 284 provided with lands 285, 286, 287, 288, 289 and 290. The 1-2 shift valve 113 comprises ports 291, 292, 293, 294, 295, 296, 297, 298, 299, 300 and 301. The port 292 is connected by means of a conduit 302 with the port 251 of the manual valve 102; the ports 293 and 296 are bleed ports; the port 294 is connected to the conduit 254 and thereby with the supply cavity 122 of the servo motor for the brake 34; the port 297 is connected to the conduit 283; the port 298 is connected by means of a conduit 303 with the ports 267 and 268 of the 2-3 shift valve 111; the port 299 is connected with the port 301; and the port 300 is a bleed port. A spring 304 is provided in the valve 113 for urging the piston 284 upwardly.

The range control valve 114 is under the control of the manual valve 102 and determines the starting speed ratio for drive range operation. The range control valve 114 comprises a valve piston 305 having a land 306. The valve 114 comprises ports 307, 308, 309 and 310. The port 307 is connected to the conduit 241; the ports 308 and 309 are connected by means of a conduit 311 with the port 291 of the 1-2 shift valve 113; and the port 310 is connected by means of a conduit 312 with the port 253 of the manual valve 102.

The transition valve 110 is for the purpose of preventing application of the rear brake 35 in the two drive ranges and comprises a valve piston 313 having lands 314 and 315. A spring 316 is provided beneath the piston 313 for yieldably holding it in its illustrated position. The valve 110 comprises ports 317, 318, 319, 320 and 321. The port 317 is connected to the conduit 302; the port 318 is a bleed port; the port 319 is connected by means of a conduit 322 with the servo motor 125 for the brake 35; and the port 321 is a bleed port.

The orifice control valve 109 is for the purpose of at times restricting flow of fluid with respect to the servomotors of various friction engaging devices of the transmission and comprises valve pistons 323 and 324. The piston 323 is a simple plug, and the piston 324 comprises lands 325, 326, 327 and 328. A spring 329 is disposed at the lower end of the piston 324 for yieldably holding it in its illustrated position. The valve 109 comprises ports 330, 331, 332, 333 and 334, 335, 336, 337, 338 and 339. The port 330 is connected to the conduit 322 through a restriction 340; the port 331 is connected to the conduit 215; the port 332 is connected by means of a conduit 341 to the port 276 of the 2-3 shift valve 111; the port 333 is connected through a restriction 342 with the conduit 341; the port 334 is connected by means of a conduit 343 with the disapply cavity 123 of the servo motor for the brake 34; the port 335 is connected by means of a conduit 344 with the port 275 of the 2-3 shift valve 111; the port 336 is connected by means of a conduit 345 with the port 320 of the transition valve 110; the port 337 is connected by means of a conduit 346 with the port 295 of the 1-2 shift valve 113; the port 338 is connected through a restriction 347 with the conduit 345; and the port 339 is connected by means of a conduit 348 with the port 272 of the 2-3 shift valve and by means of a branch conduit 349 with the port 214 of the throttle modulator valve 106.

The reverse inhibitor valve 115 is for the purpose of preventing a completion of reverse drive when the selector 256 is moved into its reverse drive position at relatively high forward vehicle speeds. The reverse inhibitor valve 115 comprises a piston 350 having lands 351, 352 and 353. A spring 354 is provided for yieldably holding the piston 350 in its illustrated position. The valve 115 comprises ports 355, 356, 357, 358, 359, 360 and 361. The port 355 is a bleed port; the port 356 is connected by means of a branch conduit 362 with the branch conduits 348 and 349; the port 357 is connected by means of a conduit 363 with the port 252 of the manual valve 102; the port 358 is connected to the conduit 254; the port 359 is connected by means of a conduit 364 with both the piston 59 for the front clutch 32 and also with the port 179 of the governor 116; the port 360 is connected by means of a conduit 365 with the port 247 of the manual valve 102; and the port 361 is connected with the conduit 241.

The governor safety valve 112 is for the purpose of assuring that no governor pressure exists for reverse driving. The governor safety valve 112 comprises a piston 366 having lands 367 and 368. A spring 369 is provided for yieldably holding the piston 366 in its illustrated position. The valve 112 comprises ports 370, 371, 372 and 373. The port 370 is a bleed port; the port 371 is connected by means of a branch conduit 374 with the conduit 241; the port 372 is a bleed port; and the port 373 is connected to the conduit 349.

In operation, the transmission is maintained in its various ranges under the control of the manual valve 102. The transmission is in neutral condition when the manual selector valve piston 242 is in its N or neutral position. When the engine 29 begins operating, the pump 100 driven by the engine supplies line pressure to the conduits 135 and 141 and connected conduits, pumping oil from the sump 136 through the pump inlet 134. The conduit 141 is connected with the conduit 135 through the check valve 145, the check valve 145 being held open by the fluid pressure from the pump 100. This fluid pressure in the conduit 141 holds the check valve 142 closed so that fluid cannot escape through the rear pump 101, which is assumed inoperative at this time with the vehicle being stationary. In the neutral condition of the piston 242, the groove between the lands 244 and 245 connects the ports 249 and 250 supplied with line pressure through the conduit 141, and the lands block flow of line pressure to any of the other ports of the manual valve 102. The manual valve piston 242 thus prevents application of fluid pressure to the engaging pistons for any of the power train completing clutches and brakes of the transmission.

The main oil pressure regulator valve 107 functions for all conditions of the transmission and its hydraulic control system to regulate the line pressure in the conduit 141 and connected conduits to predetermined maximum values. For this purpose, the line pressure from the conduit 141 is supplied through the port 157 between the lands 151 and 152; and, since the land 151 is of larger diameter than the land 152, the line pressure applied to these lands tends to move the regulator valve piston 148 upwardly against the action of the spring 153. This movement of the piston 148 tends to release the line pressure from the conduits 141 and 135 between the lower edge of the land 149 and the lower edge of the port 154 into the converter supply conduit 171 through the port 155. The spring 153 is of such strength that the port 154 will not be thus opened by line pressure influence on the valve piston 148 until a certain fixed value of line pressure is reached. This fixed value of line pressure is maintained by the valve 107 in thus metering and relieving excess fluid under pressure from the conduit 141, assuming that there are no other influences on the piston 148 than just mentioned.

For most conditions of operation, however, an additional variable force is applied to the piston 148 tending to move it, and this third force is due to fluid pressure of different values (which may be termed compensator pressure) applied to the lower end of the piston 148 through the port 158 and conduit 238. For the neutral condition of the transmission, when the accelerator 192 is in its closed throttle, relaxed position; the compensator pressure is equal to full line pressure which is supplied to the lower end of the piston 148 through the port 158. Line pressure flows from the conduit 141 through the port 234 of the compensator valve 105, the groove between the lands 220 and 221, the port 228 and the conduit 238 to the port 158. Line pressure is supplied from the compensator pressure conduit 238 through the port 229 between the lands 221 and 222; and, since the land 221 is larger than the land 222, this line pressure tends to move the compensator valve piston 217 to the left against the actions of the springs 227 and 226. However, for this condition of operation, the springs acting on the piston 217 are of sufficient strength to hold the piston 217 to the limit of its movement to the right.

The fluid pressure applied to the main oil regulator valve piston 148 on its lower end provides a force acting against the spring 153 tending to move the piston 148 upwardly as seen in the figure to more fully open the port 154 to the conduit 171. The full line pressure applied to the lower end of the piston 148 thus maintains the line pressure in the conduit 141 and connected conduits at a predetermined minimum, which, for one certain embodiment of the invention is 75 p.s.i.

The secondary main regulator valve 108 regulates the fluid pressure within the conduit 171 and thereby within the torque converter 31 to which the conduit 171 supplies fluid pressure. The pressure in the ports 155 and 159 and in the conduit 171 is applied between the lands 161 and 162 of the low oil pressure regulator valve piston 160 through the port 165. Since the land 161 is larger than the land 162, this fluid pressure tends to move the piston 160 upwardly against the action of the spring 164 to open up the port 169 and meter fluid between the land 161 and an edge of the port 169. Thus, as the fluid pressure in the conduit 171 and in the converter 31 tends to increase, the excessive fluid pressure is discharged through the port 169; and the pressure in the conduit 171 and converter 31 is regulated to a predetermined maximum.

The conduit 173 is connected to various working parts of the transmission for lubricating them; and, when this conduit is filled, the valve piston 160 moves slightly farther against the action of the spring 164 on a slight increase in pressure in the converter 31 so as to relieve fluid from the port 168 through the groove between the lands 162 and 163 and through the bleed port 167. At this time, the regulating effect of the valve 108 takes place between the land 162 and the lower edge of the port 168, and the fluid flows through the conduit 171 and through the torque converter 31 to the conduit 172 which is the fluid discharge conduit for the torque converter 31.

The compensator pressure in the conduit 238 is also applied to the valve piston 160 for changing the regulated converter pressure in the conduits 171 and 172 and in the torque converter 31 for various conditions of operation of the transmission and controls. The pressure on the lower end of the valve piston 160 tends to move the piston 160 upwardly against the action of the spring 164 to open the discharge port 168 for the torque converter to the bleed port 167 and to thus further relieve and decrease the pressure in the conduits 171 and 172 and converter 31. With full line pressure in the conduit 238 for conditions of operation just mentioned, the regulated converter pressure in the torque converter 31 is at a minimum which, for one particular embodiment of the invention is substantially 30 p.s.i.

Under certain relatively abnormal conditions, as, for example, when the oil in the sump 136 is cold; the conduit 174 relieves the fluid pressure in the converter 31 and in its supply conduit 171. The resultant increased pressure due to cold oil in the conduit 171 applied to the relatively large land 161 will move the piston 160 still farther upwardly against the action of the spring 164 so as to connect the ports 170 and 165 by means of the groove between the lands 161 and 162. In this case, the regulating action by the valve piston 160 is by virtue of a metering effect between the lower edge of the land 161 and the port 170, and the excessive fluid flowing through the port 170 flows directly through the conduit 174 to the inlet conduit 134 of the pump 100.

The transmission and its control system are conditioned for operation in the D2 range, that is, in automatic range in which the vehicle starts in intermediate speed drive, by moving the manual selecter valve piston 242 into its D2 position. In this position, the piston 242 provides a connection between the ports 253, 246, 247, 248 and 249 by means of the groove between the lands 243 and 244. The port 249 carries line pressure, being connected with the line pressure supply conduit 141. The line pressure is thus supplied to the ports 248, 247, 246 and 253.

Pressure from the port 248 flows through the conduit 254 to the port 358 of the reverse inhibitor valve 115 and is blocked at that port by the land 352 of the inhibitor valve piston 350 at this time. Line pressure is also supplied from the conduit 254 to the apply cavity 122 of the servo motor 117 for the front brake 34, and the piston 118 thus moves and applies the band 67 of the brake 34 to engage the brake through the intermediary of the bell crank 119. Line pressure is also supplied from the conduit 254 to the port 294 of the 1–2 shift valve 113 but is blocked at that port at this time as will be described.

The line pressure in the port 247 flows through the conduit 365, the port 360 of the reverse inhibitor valve 115, the groove between the lands 352 and 353, the port 359 and the conduit 364 to the piston 59 of the clutch 32 thus applying the clutch. Line pressure also flows through the conduit 364 to the port 179 of the governor valve 116, but under standstill or low speed conditions, the port 179 is blocked by the land 177 of the valve 116.

The line pressure in the port 246 of the manual valve 102 flows through the conduit 282 to the port 274 of the 2–3 shift valve 111, and the land 263 of this valve blocks the port 274 at this time.

The line pressure at the port 253 of the manual valve 102 flows through the conduit 312 and the port 310 of the range control valve below the piston 305 of this valve, and through the port 309 and the conduit 311 to the port 291 of the 1–2 shift valve 113. The line pressure below the valve piston 305 at this time maintains the piston 305 in its illustrated position. The line pressure applied through the port 291 acts on the land 290 of the 1–2 shift valve and moves the piston 284 of this valve to its intermediate speed position at the limit of its movement downwardly as seen in the figure against the action of the spring 304, so that the land 288 of the piston 284 blocks the port 294 which is supplied with line pressure at this time as has been described.

Since the clutch 32 is engaged due to line pressure from the port 247 of the manual valve and the brake 34 is engaged due to line pressure from the port 248 of the manual valve, the transmission is in intermediate speed drive.

When the intermediate speed power train is completed as just described, by engagement of the clutch 32 and the brake 34, the accelerator 192 is assumed to be in its closed throttle position with the vehicle engine crankshaft rotating at idling speed. Under these conditions, insufficient power is transmitted through the intermediate speed power train and in particular through the hydraulic torque converter 31 for driving the driven shaft 26 and the vehicle, and the drive may be made effective for driving the vehicle by simply depressing the accelerator 192 to open the engine throttle.

Throttle opening movement of the accelerator 192 also has other effects on the hydraulic control system, including an increasing of the line pressure in the conduit 141 and connected conduits for increasing the applying pressure for the brake 34 and the clutch 32, and throttle opening movement also effects an increasing of the fluid pressure within the hydraulic torque converter 31.

The accelerator 192 acts on the throttle valve piston 193 through the intermediary of the downshift valve piston 186 to provide a throttle pressure in the conduit 215 which is less than the line pressure in the conduit 141 and which increases from zero at closed throttle position of the accelerator to line pressure at open throttle position. The throttle valve 104, like the valves 107 and 108, is a regulator valve providing a variable fluid pressure by metering fluid flow between a valve land and a valve port in accordance with variable forces impressed on the valve. The accelerator 192 tends to move the throttle valve piston 193 to the right as seen in the figure, upon depression of the accelerator, by means of the downshift valve piston 186 and the spring 201. Such movement of the throttle valve piston 193 provides a connection between the ports 197 and 199 through the groove between the lands 194 and 195, admitting fluid under pressure into the conduit 215 through the port 199. The pressure in the conduit 215 flows back through the port 198 and is thus effective on the lands 195 and 196. Since the land 195 is of larger diameter than the land 196, the fluid pressure on the lands tends to move the valve piston 193 back to the left against the action of the spring 201, so that the land 195 tends to again close the port 197 and block further admittance of fluid pressure to the conduit 215. The greater the depression of the accelerator, the greater will be the force from the spring 201 on the throttle valve piston 193, and the greater must be the pressure in the conduit 215 for closing the port 197 by the land 195; and hence, the valve 104 has a regulating action to provide a throttle pressure in the conduit 215 which increases with accelerator depression.

The throttle pressure from the throttle valve 104 is supplied through the conduit 215 to the throttle modulator valve 106 through the port 210. The valve 106 functions to provide a limited or so-called modulator pressure in the conduit 239. This limited pressure in the conduit 239 is the same as the throttle pressure in the conduit 215 up to a predetermined maximum value, and for further increases in throttle pressure corresponding to increased openings of the engine throttle, the modulator pressure in the conduit 239 remains at this predetermined maximum value. The throttle pressure in the conduit 215 flows through the port 210 of the throttle modulator valve and through the groove between the lands 204 and 205 to the port 213 and the conduit 239. The spring 208 is a relatively light spring as compared to the spring 207, and this spring 208 functions to normally maintain the valve piston 203 in its illustrated position with the spring retainer 206 contacting the adjacent end of the bore for the piston 203 and with the spring 207 holding the retainer 206 and the piston 203 at the limit of their movement apart. The spring 208, under these conditions, is substantially at its free length and assures that the ports 210 and 213 remain in communication by means of the groove between the lands 204 and 205 until the modulator pressure in the conduit 239 reaches its predetermined value.

The modulator pressure in the conduit 239 is applied to the lands 204, and 205 of the throttle modulator valve 106, and since the land 204 is larger than the land 205, this fluid pressure tends to move the piston 203 to the left against the action of the spring 207, the spring retainer being bottomed under these conditions on the adjacent end of the cavity in which the piston 203 is disposed. When the fluid pressure in the conduit 239 reaches its predetermined maximum value, the pressure moves the piston 203 to the left and closes the port 210 by means of the land 205, so that the pressure of the fluid in the conduit 239 increases no further. In the particular embodiment of the invention mentioned before, the modulator pressure in the conduit 239 had a maximum of 22 p.s.i. at about 25% throttle opening, and the modulator pressure remained constant for additional throttle opening movements of the accelerator.

The modulator pressure in the conduit 239 is applied to the compensator valve 105, which is a regulator valve, for providing a compensator pressure in the conduit 238 that decreases with depression of the accelerator pedal for initial throttle opening movements of the accelerator. The compensator pressure in the conduit 238 also increases with the speed of the driven shaft 26 and the vehicle. In this connection, the action of the governor valve 116 in producing a governor pressure in the conduit 241 which is connected to the compensator valve, will now be described.

The governor valve 116, like the valves 104 and 105, is a regulator valve; that is, it produces an output pressure that varies gradually with changing forces on the valve. The casing 175 for the valve 116 rotates with the driven shaft 26 of the transmission, and the valve piston 176 and the weight 183 tend to move outwardly under the influence of centrifugal force. The weight 183, in particular, has a relatively large centrifugal force acting on it, and this force is transmitted to the hollow valve piston 176 by means of the spring 185 disposed between the piston 176 and the spring retainer 184. Line pressure is present in the conduit 364; and, on outward movement of the valve piston 176, fluid flows through the port 179, the groove between the lands 177 and 178, and the port 180 into the conduit 241 to supply pressure to the latter conduit. The pressure in the conduit 241 is applied to the facing ends of the lands 177 and 178, and since the land 177 is larger in diameter than the land 178, this fluid pressure tends to move the piston 176 inwardly of the valve casing 175, so that the land 177 will move over the port 179 and block any further admission of fluid pressure to the conduit 241. A balance is attained between the centrifugal force effective on the valve piston 176 tending to move the piston outwardly of the casing 175, which increases with vehicle speed, and the force in the conduit 241 effective on the lands 177 and 178 tending to move the piston 176 inwardly, which increases with the pressure in the conduit 241, for every speed of the driven shaft 26. The valve piston 176 thus meters the flow of fluid under pressure to the governor output conduit 241 between the land 177 and the inner edge of the port 179 and provides a regulated governor pressure in the conduit 241 that increases with the speed of the driven shaft 26 and of the vehicle. The function of the spring 185 effectively between the weight 183 and the valve piston 176 is to allow the weight 183 to move outwardly of the casing 175 and radially with respect to the shaft 26 without corresponding movement of the piston 176 at the higher speeds of the shaft 26. This arrangement provides a governor pressure that increases more gradually with increases in speed of the driven shaft 26 than would be obtained if the piston 176 has a solid connection with the weight 183.

The governor pressure in the conduit 241 that increases with the speed of the driven shaft 26 and of the vehicle is impressed through the ports 232 and 237 on the compensator valve 105 and particularly on its pistons 216 and 218. The governor pressure applied on the piston 218 through the port 232 is not immediately effective on the piston 217, which is the regulating piston of the compensator valve 105, when the vehicle is being started, since line pressure is supplied between the lands 224 and 225 from the conduit 141 and the port 233. The governor pressure starts from zero when the vehicle is at a standstill and increases, while the line pressure is at some much higher value, such as 75 p.s.i. under the same conditions. Since the land 225 is larger than the land 224, the piston 218 is held to the limit of its movement to the right out of contact with the regulating piston 217 until the governor pressure increases sufficiently to overcome the effect of line pressure on the lands 224 and 225. The governor pressure in the conduit 241 is initially, at low speeds of the vehicle, effective through the valve piston 216 on the regulating valve piston 217. The governor pressure is applied through the port 237 on the piston 216 and force on the piston 216 is transmitted through the spring 227 to the piston 217 tending to move the latter to the right, the force so impressed on the piston 217 increasing with governor pressure and vehicle speed.

The modulator pressure in the conduit 239 that increases with accelerator opening to a predetermined maximum is impressed on the lands 222 and 223; and since the land 222 is larger than the land 223, this modulator fluid pressure tends to move the compensator piston 217 to the left. This is just opposite to the effect of the increasing governor pressure in the conduit 241.

Line pressure is supplied to the port 234 from the conduit 141, and the piston 217 functions to regulate so as to provide compensator pressure in the conduit 238. This compensator pressure increases with increasing governor pressure in the conduit 241 and decreases with increasing throttle pressure in the conduit 215 and modulator pressure in the conduit 239. The springs 226 and 227 tend to hold the piston 217 to the limit of its movement to the right opening the port 234 by means of the groove between the lands 220 and 221 to the port 228 and the compensator conduit 238. Fluid thus flows into the compensator conduit 238. The compensator pressure in the conduit 238 flows through the port 229 between the lands 221 and 222 and tends to move the piston 217 to the left so as to close the port 234 by means of the land 221, this return movement of the piston 217 being by virtue of the fact that the land 221 is larger than the land 222. Thus, the land 221 meters fluid flow between it and an edge of the port 234, providing a certain regulated compensator pressure in the conduit 238. The governor pressure tends to move the piston 217 to the right as above described so as to move the land 221 off the port 234 and admit further fluid pressure to the compensator conduit 238. Thus, the compensator pressure in the conduit 238 increases with governor pressure and vehicle speed. The modulator pressure, as above described, tends to move the piston 217 to the left to close the line pressure supply port 234 by means of the land 221, and thus, the compensator pressure in the conduit 238 decreases with increasing throttle pressure and modulator pressure.

The piston 218, at higher speeds of the vehicle, reduces the effect of the governor pressure just described in increasing the compensator pressure in the conduit 238. As the governor pressure in the conduit 241 rises, eventually it is sufficient so as to move the piston 218 to the left, so that this piston acts on the piston 217 and tends to move the latter piston to the left against the force due to the governor pressure transmitted through the piston 216. The piston 218 is moved to the left by the governor pressure when the governor pressure overcomes the effect of the line pressure impressed through the port 233 on the lands 224 and 225 tending to move the piston 218 to the right. The line pressure in the conduit 141 and applied to the lands 224 and 225 decreases with increasing governor speeds as will be hereinafter described, and there thus exists a crossing of the effect of line pressure which decreases with increasing vehicle speed and governor pressure which increases with vehicle speed, both effective on the piston 218, after which the piston 218 is effective on the valve piston 217 and its regulating action.

When the vehicle begins to move, after the accelerator 192 has been moved toward its open throttle position to increase the speed and power output of the vehicle engine, the rear pump 101 begins its pumping action and draws fluid through the intake conduit 139 from the sump 136 and discharges it into the outlet conduit 140. The check valve 142 remains closed until the pressure of the fluid discharged by the rear pump 101 increases to a sufficient value to overcome the forces due to the line pressure and the spring 144 on the piston 143; and at this time, the check valve 142 opens and the rear pump discharges into the line pressure conduit 141. The fluid flow through the line pressure conduit 141 then reverses and closes the check valve 145 by moving the piston 146 upwardly onto its seat. The closing of the check valve 145 blocks discharge by the front pump 100 into the line pressure conduit 141 and its connected conduits, and the rear pump now becomes the sole supply of line pressure for the conduit 141 and connected conduits. The line pressure in the conduit 141 is impressed on the main oil pressure regulator valve piston 148 and particularly its lands 151 and 152 through the port 157 to provide the regulating action between the land 149 and the port 154 when the front pump alone is providing the line pressure, and when the line pressure increases slightly due to closing of the check valve 145 and opening of the check valve 142 as just described, the piston 148 is moved upwardly slightly, since the line pressure is effective to move the piston 148 in this direction due to the land 151 being larger than the land 152. Under these conditions, the port 154 is fully opened so as to connect the ports 154 and 159. The regulating effect of the valve 107 is now between the lower edge of the land 150 and the lower edges of the ports 155 and 159, with the excess pressure produced by the rear pump 101 escaping from the port 156 and the groove between the lands 150 and 151 to the ports 155 and 159. With the rear pump 101 being thus active to produce the line pressure, the line pressure is now regulated exactly as has been previously described, except that it is slightly higher in value and is metered between the land 150 and ports 155 and 159 instead of between an edge of the port 154 and the land 149. The front pump now functions solely to supply fluid under pressure to the converter 31 and for lubrication.

The compensator pressure in the conduit 238, as it changes with accelerator opening and vehicle speeds, causes a change in the line pressure regulating action of the main oil pressure regulator valve 107 as compared with its operation when the accelerator is in its closed throttle position and the vehicle is stationary. The pressure in the conduit 238 is impressed on the lower end of the main oil pressure regulator valve piston 148 through the port 158 and tends to move the piston 148 upwardly against its spring 153 to more fully open the port 154 or the ports 155 and 159 depending on which of these ports is regulating, with the driven shaft pump 101 being inactive in one case and active in the other case. The piston 148 thus vents the line pressure conduit 141 less and maintains the line pressure in the conduit 141 at a higher value as the compensator pressure in the conduit 238 decreases and acts conversely to maintain line pressure at a lower value as the compensator pressure increases. As has been explained, the compensator pressure in the conduit 238 increases with governor pressure in the conduit 241 and increasing vehicle speed and decreases with increasing throttle pressure and throttle opening. Therefore, the line pressure, which is initially applied to the servo motor 117 for the front brake 34 and also through the piston 59 for the front clutch 32 for engaging these friction devices when the selector valve piston 242 is in its D2 position, increases with accelerator opening and decreases with increasing vehicle speed. The line pressure is made to increase with increased accelerator opening so that the front clutch 32 and front brake 34 have the capacity to take the additional torque from the vehicle engine which results from depression of the accelerator 192 and opening of the engine throttle. As has been hereinbefore explained, the hydraulic torque converter 31 is of the usual type providing a decreased torque multiplication as the speed increases; and, therefore, line pressure can be and is decreased with increasing governor pressure and vehicle speed, since the engaging devices and the gearing behind the torque converter 31 need take a decreasing torque with a decreasing torque multiplication of the torque converter 31. The line pressure is also supplied to the servo motor 125 for the brake 35 and to the piston 65 for the clutch 33 for engaging these friction devices when the transmission is in low speed drive, at times, or high speed drive, as will be described. The line pressure is made to vary as above described, in accordance with throttle opening and vehicle speed, so that the engaging pressures of the friction brakes and clutches are just a little higher than is required to carry the torque by each of these clutches and brakes as the vehicle speed and engine throttle opening vary. It has been found that, if these clutches and brakes are engaged for changing drives through the transmission with such engaging pressures, which are just a little higher than sufficient for carrying the torque, the engagement of the friction engaging devices and the consequent completions of the power trains are relatively smooth.

The compensator pressure in the conduit 238 functions on the low oil pressure regulator valve 108 to cause an increase in the pressure within the torque converter 31 as the accelerator is depressed and to cause a decrease in the pressure within the torque converter 31 as the vehicle speed increases. The compensator pressure is applied to the lower end of the regulator valve 108 and tends to move the piston 160 upwardly against the action of the spring 164 so as to increase the metering effect between the land 162 and the lower edge of the port 168, thereby relieving a greater amount of fluid from the torque converter 31 flowing through the outlet conduit 172 of the torque converter 31. Thus, as the compensator pressure in the conduit 238 increases, the bleeding effect of the valve 108 is increased to decrease the fluid pressure in the converter 31; and, as the compensator pressure decreases, this bleeding effect decreases to cause an increase in the pressure in the torque converter 31. Thus, the pressure in the torque converter 31 is increased as the vehicle accelerator is moved toward open throttle position, and the pressure in the torque converter is decreased as the vehicle speed increases. This regulating action of the fluid pressure in the torque converter 31 is provided, since a greater fluid pressure is required in the torque converter with increasing torque output of the vehicle engine, and a decreasing pressure in the torque converter 31 is sufficient with decreased torque multiplication by the torque converter with increasing vehicle speeds.

The 2–3 shift valve 111 has the governor pressure from the conduit 241 impressed on it through the branch conduit 280 and the ports 271 and 269. The governor pressure is effective on the upper end of the valve piston 260 and on the upper surface of the land 261 and tends to move the piston 260 and the piston 259 downwardly out of the intermediate speed positions of the pistons in which they are illustrated into their high speed drive positions. This movement of the valve pistons 260 and 259 is opposed by three different forces, namely, throttle pressure, exerted through the plug 258 and the spring 266, a "shift valve plug pressure" applied on the lower face of the land 261, and the force due to the spring 265. The throttle pressure is applied to the lower end of the valve piston 258 through the conduit 215 and the port 279, and this throttle pressure is effective through the spring 266 tending to oppose movement of the piston 259 downwardly. The spring 265 is effective between the land 261 and a fixed part and also tends to hold the piston 259 against such movement.

The plug 258 functions as a regulator valve to provide the "shift valve plug pressure" effective on the land 261. The throttle pressure in the conduit 215 applied to the lower end of the plug 258 tends to move the plug against the action of the spring 266 so as to open the port 267 and thereby supply pressure to the conduit 303 and the port 268 of the 2–3 shift valve. The pressure supplied to the port 268 flows into the cavity for the valve piston 259 and acts on the upper end of the plug 258 tending to return the plug 258 downwardly to a position blocking the port 267. The plug 258 thus functions as a regulating valve, opening the port 267 on an increase in throttle pressure and closing the port 267 when the pressure within the conduit 303 and within the cavity for the piston 259, which is termed the "shift valve plug pressure," becomes sufficient to augment the force due to the spring 266 sufficiently so as to move the plug 258 downwardly. This "shift valve plug pressure" increases with throttle pressure but is less than throttle pressure by a predetermined amount due to the force provided by the spring 266 on the plug 258. This "shift valve plug pressure" in the cavity for the piston 259 is applied on the lower face of the land 261 and also, in addition to the other two forces above mentioned, tends to hold the piston 259 from movement downwardly into its high speed drive position.

When the governor pressure in the conduit 241, which is applied to the 2–3 shift valve 111 through the ports 271 and 269, becomes sufficiently great, so that it overcomes the force on the pistons 260 and 259 due to the "shift valve plug pressure" on the lower face of the land 261, the force due to the spring 265, and the force due to the throttle pressure on the plug 258 exerted through the spring 266 on the piston 259; the pistons 258, 259 and 260 move to the limit of their movement downwardly into their high speed positions in which the groove between the lands 264 and 263 connects the ports 274 and 273. Line pressure is supplied to the port 274 of the 2–3 shift valve 111 from the conduit 282 and the port 246 in the manual valve 102, and line pressure thus flows between the lands 263 and 264, the port 273 and the conduit 281 to the piston 65 for the rear clutch 33 and engages the rear clutch 33. The front clutch 32 remains engaged, and the high speed power train is thus completed through the transmission.

The line pressure in the conduit 281 provided by the valve 111 when the piston 259 is moved into its high speed position is also supplied to the disapply cavity 123 of the servo motor 117 for the front brake 34. The piston 259 in its high speed drive position connects the ports 277 and 276 by means of the groove between the lands 262 and 263, and line pressure flows from the conduit 281, through the ports 277 and 276, the conduit 341, the port 332 of the orifice control valve 109, the groove between the lands 325 and 326 of the orifice control valve piston 324, the port 334 and the conduit 343 to the disapply cavity 123 of the servo motor 117 for the front brake 34. The orifice control valve 109 is under the control of throttle pressure in the throttle pressure conduit 215 which is applied on the upper end of the orifice control valve piston 324 through the port 331. The throttle pressure holds the piston 324 moved to the limit of its movement downwardly as seen in the figure against the action of the spring 329 whenever the accelerator is depressed to a substantial extent to provide a substantial throttle pressure. It is assumed that this change from intermediate speed drive to high speed drive is made when the accelerator is at some open throttle position so that the upper port 332 and the port 334 are completely opened with respect to each other; and, therefore, the fluid flowing through the conduit 341 to the disapply cavity 123 of the servo motor 117 is not impeded by the restriction 342 of the orifice control valve 109. The line pressure supplied to the disapply cavity 123 of the servo motor 117 augments the action of the spring 124 to move the piston 118 of the servo motor 117 back into its brake disapplying position, such movement being against the action of the line pressure within the cavity 122 of the servo motor 117. The disengagement of the brake 34 breaks the intermediate speed drive.

A downshift from high speed drive to intermediate speed drive may be obtained with the accelerator 192 released and with the vehicle coasting with decreasing speed to a stop. Under these conditions, the governor pressure supplied to the ports 271 and 269 of the 2–3 shift valve 111 is decreasing, and the throttle pressure applied to the plug 258 and the "shift valve plug pressure" applied on the lower face of the land 261 are substantially zero. Eventually, the governor pressure will decrease to the point at which the springs 266 and 265 are effective so as to move the pistons 259 and 260 upwardly to the limit of their movement into the intermediate speed positions of the pistons. The line pressure at the port 274 in the intermediate speed position of the piston 259 is blocked by the land 263, and the conduit 281, which has fluid pressure applied to it for completing the high speed drive, is drained to the sump through the port 273, the groove between the lands 263 and 264, the port 272, the conduit 348, the conduit 362, the port 356, the groove between the lands 351 and 352 of the reverse inhibitor valve 115, the port 357, the conduit 363 and the port 252 of the manual valve 102. The clutch 33 connected with the conduit 281 is thus released.

The disapply cavity 123 of the servo motor 117 for the front brake 34 is drained for this change of drive through the orifice control valve which functions under these conditions to retard the drain from the cavity 123 so as to cushion the engagement of the brake 34 and prevent an unduly harsh completion of the intermediate speed drive. Since the accelerator is released, the throttle pressure in the conduit 215 is at substantially zero value, and the spring 329 of the orifice control valve 109 is effective to hold the valve piston 324 at the limit of its movement upwardly so as to block the ports 333 and 334 with respect to the port 332. Pressure drains from the release cavity 123 through the conduit 343, the permanently connected ports 334 and 333, the restriction 342, the port 276, the groove between the lands 262 and 263 of the 2–3 shift valve 111, the port 275, the conduit 344, the port 335, the groove between the lands 327 and 328 of the orifice control valve 109, the port 337, the conduit 346, the port 295, the groove between the lands 287 and 288 and the bleed port 296. In D2 position of the manual valve 102, as has been previously described, the 1–2 shift valve piston 284 is held at the limit of its movement downwardly against the action of the spring 304 by line pressure impressed on its upper end, and the groove between the lands 287 and 288, under these conditions, thus connects the ports 295 and 296. Since the fluid from the release cavity 123 of the servo motor 117 drains through the restriction 342, application of the brake 34 is delayed, thereby smoothing the shift from third speed ratio to second speed ratio with the accelerator in closed throttle position.

A kickdown, that is, a downshift at open throttle position of the accelerator 192, may be had due to the action of the downshift valve 103. Movement of the accelerator 192 to an open throttle position and a corresponding movement of the downshift valve piston 186 connects the ports 190 and 189 by means of the groove between the lands 187 and 188. The port 190 is connected with the line pressure supply conduit 141, and line pressure is thus supplied through the port 189 and the conduit 283 connected therewith to a port 278 of the 2–3 shift valve 111. Assuming that the transmission is in direct drive, and the pistons 258, 259 and 260 are in their direct drive positions to the limit of their movement downwardly, the port 278 is open with respect to the land 261; and line pressure from the port 278 is thus applied onto the lower face of the land 261. This application of line pressure moves the pistons 260 and 259 to the limit of their movement upwardly into their intermediate speed drive positions, assuming that the vehicle is not travelling at an unduly high speed at which the governor pressure applied to the pistons 260 and 259 through the ports 269 and 271 would be sufficient to prevent this movement. The shift valve piston 259 in its intermediate speed position drains the conduit 281 as previously described so as to disengage the rear clutch 33.

The 2–3 shift valve 111 in its intermediate speed drive position also connects the ports 275 and 276 by means of the groove between the lands 262 and 263 as has been previously described, and the disapply cavity 123 of the front brake servo motor 117 is drained through the orifice control valve 109, the 2–3 shift valve 111 and the 1–2 shift valve 113 as previously described. For a kickdown condition, when the accelerator is in its open throttle position, the throttle pressure in the conduit 215 is relatively high, and this is impressed through the port 331 on the land 325 of the orifice control valve 109 holding the piston 324 of this valve at the limit of its movement downwardly against the action of the spring 329. In this case, therefore, draining of the conduit 343 and the release cavity 123 of the servo motor 117 takes place around the restriction 342, through the port 334, the groove between the lands 325 and 326 and the port 332, so that the application of the front brake 34 is relatively rapid as is desired under high engine torque conditions.

The manual valve 102, in its D1 position, so controls the transmission that it will start in low speed drive and on increasing vehicle speed will shift into intermediate speed drive and thereafter will subsequently shift into high speed drive. The manual control valve piston 242 in its D1 position connects the same ports with the line pressure supply port 249 as were connected in the D2 position of the manual valve piston 242, with the exception that the port 253 is blocked with respect to the port 249 and is drained through the front end of the cavity in which the manual valve piston 242 is disposed. The release of fluid pressure in the port 253 causes a corresponding bleeding of fluid pressure from the lower end of the range control valve 114, the flow being through the port 310, the conduit 312 and the port 253. The upper end of the range control valve 114 is connected by means of the port 307 with the governor pressure output conduit 241, and governor pressure is exerted on the upper end of the range control valve piston 305 moving it to the limit of its movement downwardly, whenever there is any governor pressure with movement of the vehicle, so that the ports 307 and 308 are connected. The governor pressure is thus supplied through the conduit 311 and the port 291 on the upper end of the 1–2 shift valve 113. Prior to such movement, assuming that the valve 102 is put into D1 position when the vehicle is stationary and the governor pressure is zero, the conduit 311, together with the upper end of the cavity in which the piston 284 is disposed, are drained through the ports 309 and 310 connected whenever line pressure is applied on the lower end of the range control valve piston 305 as in the D2 range. The spring 304, under these conditions, holds the 1–2 shift valve piston 284 upwardly in its low speed position and thus assures that the piston 284 is in its low speed position when a start is made in the D1 range.

The 1–2 shift valve piston 284, when in its low speed position shifted to the limit of its movement upwardly, connects the ports 294 and 295 by means of the groove between the lands 287 and 288. The port 294 carries line pressure from the conduit 254 and port 248 of the manual valve 102, and line pressure is thus supplied to the conduit 346 connected with the port 295. Fluid pressure flows from the conduit 346 and through the ports 337, 338, 336 and 335 and between the lands 327 and 328 of the orifice control valve 109. The fluid pressure flows from the ports 336 and 338 through the conduit 345 to the port 320 of the transition valve 110; however, under these conditions, the pressure is blocked in the transition valve 110 by the land 315. The transition valve under some conditions of operation provides pressure through the conduit 322 to the servo motor 125 for the rear brake 35 for completing a low speed two-way power train; however, due to the provision of the one-way brake 70, application of the friction brake 34 is not necessary for completing a low speed drive from the drive shaft 25 to the driven shaft 26.

Line pressure flows from the port 335 of the orifice control valve 109 through the conduit 344, the port 275, the groove between the lands 263 and 262, the port 276, the conduit 341, the permanently connected ports 333 and 334 and the conduit 343 to the disapply cavity 123 of the servo motor 117, maintaining the brake 34 disengaged as has been previously described in connection with other conditions of operation of the transmission.

In the D1 position of the manual valve 102, the port 247 and its connected conduit 365 remain supplied with line pressure as in the D2 position of the manual valve piston 242, and this line pressure is supplied through the reverse inhibitor valve 115 and the conduit 364 to both the front clutch 32 for holding the clutch 32 engaged and also to the governor valve 116. Since the clutch 32 is engaged, the low speed power train through the transmission is completed, with the one-way brake 70 functioning to take the reaction of the planet gear carrier 52.

In D1 range, as the vehicle speed increases and the governor pressure in the conduit 241 and connected conduits increases; the increasing governor pressure, applied through the ports 307 and 308 of the range control valve 114, the conduit 311 and the port 291 of the upper end of the 1–2 shift valve 113, tends to move the 1–2 shift valve piston 284 from its low speed position, in which it is illustrated, to its intermediate speed position which is at the limit of its movement downwardly. The piston 284 moves from its low to its intermediate speed position against the action of the spring 304, and the "shift valve plug pressure" also opposes this movement of the 1–2 shift valve piston 284. As has been previously explained, the "shift valve plug pressure" is present in the ports 267 and 268 of the 2–3 shift valve 111, and the "shift valve plug pressure" is transmitted through the conduit 303, the port 298, the groove between the lands 285 and 286 of the piston 284 when it is in its low speed position, and the ports 299 and 301 to the lower end of the piston 284. When the governor pressure increases sufficiently to overcome the "shift valve plug pressure" and the force due to the spring 304, the 1–2 shift valve piston 284 moves to the limit of its movement downwardly into its intermediate speed position.

In the intermediate speed position of the valve 113, the port 294 carrying line pressure is blocked; and the port 295, which in the low speed position of the 1–2 shift valve piston 284 has line pressure applied to it, is drained to the sump through the bleed port 296 and the groove between the lands 287 and 288. The disapply cavity 123 of the front brake 34 is drained through the conduit 343, the port 334, the port 332 connected with the port 334 by means of the groove between the lands 325 and 326 of the orifice control valve 109, the conduit 341, the port 276, the groove between the lands 263 and 262, the port 275, the conduit 344, the ports 335 and 337, the conduit 346, the port 295, the groove between the lands 288 and 287 and the bleed port 296. It is assumed at this time that the orifice control valve piston 324 is moved to the limit of its movement downwardly as seen in the figure against the action of the spring 329 by throttle pressure existing in the conduit 215 and applied to the land 325 of the orifice control valve. The brake 34 is thus applied, and since the clutch 32 remains applied, the transmission is now in intermediate speed drive.

A subsequent upshift to high speed drive is obtained through the action of the 2–3 shift valve 111. This valve is subject to the governor pressure that increases with the speed of the vehicle, and this valve 111 is moved into its high speed position to complete the high speed drive by action of the increasing governor pressure in the same manner as in the D2 range.

A shift from direct drive to intermediate speed drive with the accelerator released and the vehicle speed decreasing or when the accelerator is moved to an open throttle kickdown position may be had in the D1 range in the same manner as in the D2 range.

A downshift from intermediate speed ratio to low speed ratio also may be obtained while the vehicle is travelling in intermediate speed by moving the accelerator 192 to its kickdown position, and such change in drive will occur assuming that the speed of the vehicle is not unduly high. As previously described, when the accelerator 192 is in its kickdown position, the downshift valve piston 186 connects the ports 190 and 189 thus supplying line pressure to the conduit 283. The line pressure flows from the conduit 283 to the port 297 of the 1–2 shift valve 113, and line pressure is effective on the large diameter land 287 tending to move the valve piston 284 upwardly into its low speed position against the governor pressure effective on the upper end of the piston 284. Assuming that the vehicle speed and the governor pressure are not unduly high, the piston 284 will move upwardly into its low speed position. Line pressure flows from the conduit 254 through the port 294 and the groove between the lands 287 and 288 of the 1–2 shift valve 113 and into the port 295 and the conduit 346 for completing the low speed drive as has been previously described.

The 1–2 shift valve piston 284 may also be allowed to move from its intermediate speed position to its low speed position simply by allowing the vehicle to gradually decrease in speed with a resultant decrease in governor pressure so that the spring 304 is effective to move the piston 284 back to its low speed position. Under these conditions, the 1–2 shift valve piston 284 will again provide line pressure to the conduit 346 for releasing the front brake 34 to again cause completion of the low speed free-wheeling power train.

When the manual valve piston 242 is moved into its L position, assuming that this is done while the vehicle is at rest, the low speed power train through the transmission will be completed. The manual valve piston 242 in its L position connects the ports 248 and 247 with the line pressure supply port 249 by means of the groove between the lands 244 and 243 and connects the port 251 with the line pressure supply port 250, the latter being connected along with the port 249 with the line pressure supply conduit 141. The line pressure supplied to the port 247 and the conduit 365 connected therewith supplies pressure as in previous drives through the reverse inhibitor valve 115 to the front clutch 32 for engaging it and also to the governor valve 116. As in previous drives, the line pressure supplied to the port 248 and the conduit 254 provides line pressure to the apply cavity 122 of the servo motor 117 for the front brake 34 and also to the port 294 of the 1–2 shift valve 113. Line pressure is supplied from the port 250 of the manual valve 102 between the lands 244 and 245 to the port 251 and thereby to the conduits 255 and 302. The line pressure in the conduit 255 flows through the port 191, the groove between the lands 187 and 188 of the downshift valve 103, the port 189 and the conduit 283 to both the port 278 of the 2–3 shift valve 111 and also to the port 297 of the 1–2 shift valve 113. The line pressure supplied to the port 278 acts on the lower face of the land 261 and holds the 2–3 shift valve piston 259 upwardly in its intermediate speed position regardless of subsequent increases in vehicle speed and governor pressure.

The line pressure within the cavity for the 2–3 shift valve also flows through the port 268, the conduit 303, the port 298, the groove between the lands 285 and 286 of the 1–2 shift valve 113 and the port 299 to the port 301, so that the line pressure is impressed on the bottom end of the 1–2 shift valve piston 284 tending to hold the piston upwardly regardless of increases in governor output pressure.

The line pressure in the conduit 302 flows through the port 292 of the 1–2 shift valve 113 and is impressed on the lands 289 and 290, and the line pressure so applied also tends to hold the shift valve 284 upwardly in its low speed drive position. The 1–2 shift valve, when so held in its low speed position, supplies fluid pressure to the conduit 346 through the ports 294 and 295, and as has been previously explained, fluid pressure is supplied from the conduit 346 eventually to the release cavity 123 of the servo motor 117 for the front brake 34 through the conduits 344, 341 and 343.

The line pressure in the conduit 302 is supplied through the port 317 on the upper end of the transition valve piston 313, and this causes the piston 313 to move downwardly against the action of the spring 316 so as to connect the ports 319 and 320 by means of the groove between the lands 314 and 315. Line pressure in the conduit 346 thus also flows from the port 337, between the lands 327 and 328, and through the port 336, the conduit 345, the ports 320 and 319 and the conduit 322 to the servo motor 125 for the rear brake 35, causing application of the rear brake. The clutch 32 remains applied by line pressure transmitted through the conduit 365 from the manual valve 102, and this application of the rear brake 35 completes a two-way low speed power train between the shafts 25 and 26.

Assuming that the vehicle is travelling at a substantial speed in either its D1 or D2 ranges, and the selector valve 102 is then moved into its L position, the transmission will be downshifted into its intermediate speed drive and subsequently into its low speed drive as the vehicle speed decreases. When the manual selector valve piston 242 is in its L position, the conduits 302 and 283 are pressurized with line pressure as has just been described, and the pressure in conduit 302 is transmitted through the port 278 of the 2-3 shift valve, so that the line pressure augments the action of the springs 266 and 265 in moving the 2-3 shift valve piston 259 upwardly into its intermediate speed position, this movement taking place, assuming that the governor pressure is not too high. The piston 65 for the rear clutch 33 and the disapply cavity 123 of the servo motor 117 for the front brake 34 are drained to the sump in the same manner as has been previously described in connection with a closed throttle downshift from third to second in the D2 range, and the transmission is in its intermediate speed drive.

Line pressure is effective through the port 292 from the conduit 302 on the land 290 of the 1-2 shift valve piston 284 when the piston 284 is in its intermediate speed drive position, tending to move the piston upwardly against the action of governor pressure from the conduit 311 and the port 291 into the low speed position of the 1-2 shift valve piston 284. When the governor pressure decreases sufficiently, the piston 284 moves into its low speed position under the influence of the line pressure impressed on the lower surface of the land 290 and also due to the action of the spring 304. In this position, the groove between the lands 287 and 288 of the piston 284 connects the port 294 having line pressure applied to it and the port 295 thus supplying line pressure to the conduit 346. It is assumed that the accelerator 192 is in a closed throttle position when this change in drive occurs, and the piston 324 of the orifice control valve 109 is in its illustrated position under the action of the spring 329, since the throttle pressure in the conduit 215 impressed on the land 325 of the orifice control valve 109 is at zero, and since there is no pressure at the beginning of this downshift applied on the rear brake servo motor 125 connected with the port 330 of the orifice control valve 109 through the conduit 322. The line pressure in the conduit 346 flows through the port 337, the groove between the lands 328 and 327 of the orifice control valve piston 324 and the port 335 to the conduit 344. The line pressure in the conduit 344 flows through the port 275 of the 2-3 shift valve 111, the groove between the lands 262 and 263, the port 276, the conduit 341, the restriction 342, the permanently connected ports 333 and 334 and the conduit 343 to the release cavity 123 for the front brake 34. Line pressure exists at this time in the conduit 302 connected with the port 251 of the manual valve 102, as has just been mentioned, and this line pressure is effective through the port 317 on the upper end of the transition valve piston 313, and the piston 313 is moved downwardly against the action of its spring 316 so as to connect the ports 319 and 320 by means of the groove between the lands 314 and 315. Line pressure thus also flows from the conduit 346 through the port 337, the groove between the lands 327 and 328 of the orifice control valve 109, the port 336, the conduit 345, the port 320, the groove between the lands 314 and 315 of the transition valve 110, the port 319 and the conduit 322 to the servo motor 125 for the rear brake 35.

The orifice control valve 109 by means of its restriction 347 acts to slow application of the rear brake 35 and disapplication of the front brake 34 on this change from intermediate to low speed ratio. The pistons 324 and 323 of the orifice control valve 109 are in their uppermost position initially as this ratio change takes place. The pressure on the rear brake servo motor 125 is applied on the upper end of the piston 323 through the port 330 and the restriction 340, and as the pressure in the rear brake servo motor 125 builds up, it eventually reaches a predetermined value at which movement of the pistons 323 and 324 downwardly against the action of the spring 329 takes place. During such movement, the land 327 at first covers the ports 335 and 336, and, as it travels downwardly, blocks the ports 335 and 336 with respect to the ports 337 and 338, and finally it blocks the ports 337 and 338. During this movement, the fluid pressure which flows through the conduit 346 for application to the release cavity 123 of the front brake servo motor 117 and also to the rear brake servo motor 125 thus flows through the restriction 347, and the disengaging action of the front brake 34 and the engaging action of the rear brake 35 are slowed. The restriction 340, during this operation of the orifice control valve 109, causes this movement of the piston 324 downwardly against the action of the spring 329, as the pressure in the rear servo motor 125 builds up, to be quite slow; so that this action of the restriction 347 in slowing application of pressure to the rear servo motor 125 and disapplication of pressure from the front servo motor 117 is prolonged. Initially, during this action of the orifice control valve, its land 326 blocks the ports 333 and 334 with respect to the port 332, and thus, the initial application of fluid pressure to the disapply cavity 123 of the front servo motor 117 is through the restriction 342 which functions to additionally slow the rate of disengagement of the front brake 34. The smoothing of this downshift is particularly desirable, since under closed throttle conditions, the vehicle tends to drive the engine from the driven shaft 26 through the transmission to the drive shaft 25, and the reaction on the brake 35 for this direction of drive is in the direction indicated by the arrow C, tending to wrap the band 68 on its drum 69. The completion of the low speed power train will thus be too harsh unless measures are taken to engage the brake 35, in particular, gradually for completion of this downshift.

In connection with the reverse inhibitor valve 115, it should be noted that initially, for low vehicle speeds, line pressure for all forward driving positions of the manual selector valve 102 flows from the port 247 through the conduit 365, the port 360, the groove between the lands 352 and 353, the port 359 to the conduit 364 which supplies line pressure to the front clutch 32 and also to the governor valve 116. The reverse inhibitor valve piston 350 has governor pressure from the conduit 241 effective on its lower end tending to move the piston 350 upwardly against the action of its spring 354, and increasing governor pressure will move the piston 350 upwardly in this manner so as to block the port 360. Application of line pressure to the conduit 364 is, however, not disturbed; since, when the piston 350 is so moved, it connects the ports 358 and 359 by means of the groove between the lands 352 and 353, and the port 358 is supplied with line pressure for all forward drive positions of the manual selector valve piston 242 from the port 248 and the conduit 254.

The manual selector valve piston 242 is placed in its R position in order to cause completion of the reverse drive through the transmission. In this position, the groove between the lands 243 and 244 of the valve piston 242 connects the line pressure supply port 249 with the port 248, and the groove between the lands 244 and 245 connects the line pressure supply port 250 with the ports 251 and 252. The line pressure supplied to the port 248 flows through the conduit 254, as for the other drives previously described, to the brake engaging cavity 122 of the servo motor 117 for the front brake 34 and to the port 294 of the 1-2 shift valve 113. Line pressure flows from the port 251 of the manual valve 102 through the conduit 302 to the port 317 of the transition valve and to the port 292 of the 1-2 shift valve, and line pressure also flows from the port 251 through the conduit 255, the groove between the lands 187 and 188 of the downshift valve 186 and the conduit 283 to the port 278 of the 2-3 shift valve and to the port 297 of the 1-2 shift valve. Line pressure flows from the port 252 of the manual valve 102 through the conduit 363, the port 357 of the reverse inhibitor valve, the groove between the lands 352 and 351 of this valve, the port 356 and the conduit 362 to the branch conduits 348 and 349. The line pressure in the conduit 348 is applied to the port 272 of the 2-3 shift valve 111 and to the port 339 of the orifice control valve 109, and the line pressure in the conduit 349 is applied to the port 373 of the governor safety valve 112 and to the port 214 of the throttle modulator valve 106.

The line pressure in the conduit 254 is applied to the port 358 of the reverse inhibitor valve 115 but the land 352 of the valve 115 ordinarily blocks the port 358—the exceptions to this will be hereinafter described. The pressure in the conduit 254 applied to the cavity 122 of the servo motor 117 puts a force on the piston 118 tending to engage the front brake 34; however, such engagement is prevented by the pressure in the cavity 123 as will now be described. The line pressure in the conduit 254 applied to the port 294 of the 1-2 shift valve 113 flows through the groove between the lands 287 and 288, the port 295, the conduit 346, the port 337 of the orifice control valve 109, the groove between the lands 327 and 328, the port 335, the conduit 344, the port 275 of the 2-3 shift valve 111, the groove between the lands 263 and 262, the port 276, the conduit 341, the port 333 of the orifice control valve 109, the port 334, and the conduit 343 to the disapply cavity 123 of the servo motor 117, so that the fluid in the cavity 123 augments the force due to the spring 124 in holding the piston 118 in a brake disengaging position against the force due to the line pressure in the cavity 122.

Line pressure from the port 337 of the orifice control valve also flows through the ports 336 and 338 and the conduit 345 to the port 320 of the transition valve 110. The valve piston 313 of this valve is in its lowermost position, moved downwardly against the action of the spring 316, as will be described, and line pressure thus flows from the port 320, through the groove between the lands 314 and 315, the port 319 and the conduit 322 to the servo motor 125 for the rear brake 35 for holding the brake 35 engaged.

The line pressure supplied to the port 251 flows through the branch conduit 302 to the port 317 of the transition valve, so that line pressure acts on the top of the piston 313 and moves and holds the piston 313 in its lowermost position, moved against the action of the spring 316. The transition valve 110 thus, for reverse drive, connects the ports 319 and 320 by the groove between the lands 314 and 315. The line pressure in the conduit 302 also flows to the port 292 of the 1-2 shift valve, and line pressure is thus supplied below the lands 289 and 290 and holds the 1-2 shift valve piston 284 in its illustrated position.

Line pressure flows from the port 251 of the manual valve 102 through the conduit 255, the downshift valve 186 and the conduit 283 to the port 278 of the 2-3 shift valve 111, and line pressure is thus applied on the lower face of the land 261 of the 2-3 shift valve piston 259 holding the 2-3 shift valve piston 259 in its illustrated intermediate drive position. Line pressure flows from this cavity also through the port 268, the conduit 303, the port 298 of the 1-2 shift valve, the groove between the lands 286 and 285, and the ports 299 and 301 to the lower end of the 1-2 shift valve piston 284, so that this application of line pressure also tends to hold the 1-2 shift valve piston 284 in its illustrated position. The line pressure in the conduit 283 is also supplied to the port 297 and is thus supplied onto the lower face of the land 287, and this application of line pressure also functions to hold the 1-2 shift valve piston 284 in its upper, low speed position.

The line pressure supplied through the port 252 and conduits 362 and 348 to the port 339 of the orifice control valve is applied on the lower face of the land 328 and augments the action of the spring 329 in holding the orifice control valve piston 324 in its illustrated position, even though line pressure is also applied onto the upper end of the orifice control valve piston 323 from the conduit 322 and the port 330. The line pressure supplied to the port 272 of the 2-3 shift valve 111 from the conduit 348 flows between the lands 264 and 263 of this valve, the port 273 and the conduit 281 to the piston 265 of the rear clutch 33 engaging this clutch. Since the rear brake 34 is also engaged as has been above described, the reverse drive power train is completed through the transmission.

The line pressure supplied through the conduit 349 to the port 373 of the governor safety valve 112 moves the piston 366 of the safety valve upwardly against the action of its spring 369, so that the groove between the lands 367 and 368 of this valve connects the governor pressure conduits 241 and 374 with the bleed port 372. The line pressure supplied to the port 214 of the throttle modulator valve 106 from the conduit 349 acts on the left end of the throttle modulator valve 106 for the purpose of increasing the line pressure for reverse drive as will now be described.

The line pressure applied to the left end of the throttle modulator valve 106 moves the piston 203 of this valve to the limit of its movement to the right so that this valve piston connects together the ports 213, 210 and 212. The throttle pressure in the conduit 215 and supplied to the port 210 is thus supplied to both the ports 212 and 213 and thereby through the conduits 240 and 239 to the ports 230 and 231 of the compensator valve 105. Line pressure is thus supplied not only to the land 222 but also to the land 223 of the compensator valve 105 tending to maintain the land 221 blocking the line pressure supply port 234 until a greater governor pressure in the conduit 241 is reached than for the forward drive. The compensator pressure in the conduit 238 thus, in general, for reverse drive, is lower than for the forward drives; and therefore, the line pressure in the conduit 141 and the pressure in the converter 31 for reverse drive are higher than for the forward drives. The increased line pressure for reverse drive is necessary particularly since the rear brake 35 must take a higher reaction for the reverse drive than for a low speed forward drive.

The purpose of the reverse inhibitor valve 115 is to prevent the completion of reverse drive when the vehicle is travelling above a predetermined speed in the forward direction, such as 10 m.p.h., and the manual valve piston 242 is put into its R position. A completion of the reverse drive power train when the vehicle is travelling at an excessive speed in the forward direction could, of course, seriously damage parts of the transmission, and it is my opinion that the only reason that the manual valve 102 can be shifted to its reverse drive position when the vehicle is travelling above a certain low speed, such as 10 m.p.h., in the forward direction, is due to the fact that the vehicle operator actually desires low range condition but has simply mistakenly shifted the lever 256 too far. It may be noted that the L and R positions of the valve piston 242 and the lever 256 are located next to each other. Therefore, the inhibitor valve 115 has been designed so as to actually put the transmission in low range instead of reverse drive when the manual valve piston 242 is moved to its R position above the predetermined low forward vehicle speed.

The output governor pressure in the conduit 241 is impressed on the lower end of the reverse inhibitor valve piston 350 so that the piston 350 is at the upper limit of its movement above the predetermined low forward vehicle speed, being moved against the action of its spring 354. In its upper position, the piston 350 connects the ports 359 and 358 by means of the groove between the lands 352 and 353 and connects the conduit 362 to the bleed port 355 by means of the port 356 and the groove between the lands 351 and 352. The land 352 in the upper position of the piston 350 also blocks the port 357 connected with the conduit 363 which is pressurized in the reverse drive position of the manual piston 242.

Summing up the functioning of the manual valve 102 in its L and R positions, the manual valve piston 242 in its L position provides line pressure to the output ports 247, 248 and 251, and the effect of line pressure application to these ports has previously been explained. The port 247 leads to the conduit 365 and also to the conduit 364 through the reverse inhibitor valve; thus, the application of line pressure to the conduits 255 and 302 (connected to the port 251), the conduit 254 (connected to the port 248) and the conduit 364 is required for low range drive. For reverse drive, the conduits 364 and 365 are drained while line pressure is applied instead to the port 252 connected with the conduit 363 and also with the conduit 362 through the reverse inhibitor valve. Thus, application of line pressure to conduits 362, 255, 302 and 254 results in reverse drive.

The net effect of the reverse inhibitor valve 115 is to block line pressure from the conduit 362 and instead provide line pressure to the conduit 364 above the predetermined low vehicle speed which completes the low range drive instead of reverse drive. In the R position of the piston 242, line pressure is supplied to the conduit 363, but this conduit is blocked by the land 352 of the inhibitor valve piston 350 at the port 357 when the piston 350 is in its upper position. The conduit 364 is supplied with line pressure from the conduit 254 and through the port 358, the groove between the lands 352 and 353 and the port 359. Thus, when the manual valve piston 242 is in its R position, and the reverse inhibitor valve piston 350 is at the upper limit of its movement with the vehicle speed being above the predetermined low value, the conduits 364, 254, 255 and 302 are supplied with line pressure providing low range drive in the transmission. As has been previously described, low range drive, when made effective, at a relatively high speed of the vehicle, includes a drive in second speed which changes to a drive in low speed when the vehicle speed and the governor pressure impressed on the 1-2 shift valve 113 decrease sufficiently so that the shift valve moves into its uppermost, low speed position.

When the speed of the vehicle decreases still further, below the predetermined low speed above mentioned (10 m.p.h. in one embodiment of the transmission controls); at this time, the governor pressure in the conduit 241 applied to the lower end of the reverse inhibitor valve 115 will decrease to such an extent that the reverse inhibitor valve piston 350 will move back into its illustrated position under the action of its spring 354. With the reverse inhibitor valve piston 350 in its illustrated position, the reverse drive will be completed, with the pressure existing in those conduits previously mentioned.

The governor safety valve 112 is provided for assuring that there can be no governor pressure existing in governor line 241 when the reverse drive power train is completed through the transmission. Under these conditions, and particularly when the oil used in the hydraulic transmission control system is hot and thin in consistency, some leakage takes place into the conduit 241 and associated conduits, and the governor 116 is effective to regulate any fluid pressure in this conduit, regardless of the direction in which the shaft 26 and the governor is rotating—the governor 116 is not discriminative with respect to the direction of rotation of the shaft 26. The conduit 349 is supplied with line pressure whenever the reverse drive power train is completed, and the line pressure in the conduit 349 is applied through the port 373 on the lower end of the governor safety valve piston 366 moving the piston upwardly against the action of its spring 369. In its upper position, the piston 366 connects the governor output pressure conduit 241 and its branch conduit 374 with the bleed port 372, the connection being through the port 371 and the groove between the lands 367 and 368. The governor safety valve 112 thus assures that there can be no pressure existing during reverse driving in the governor output pressure conduit 241. Such a pressure, if existing, could cause movement of the reverse inhibitor valve piston 350 upwardly which would result in a very undesirable and possibly destructive shift from reverse drive into a forward drive, particularly as the vehicle speed in reverse drive increases.

The transition valve 110 advantageously prevents application of fluid pressure to the servo motor 125 for the rear brake 35 except when the manual valve 102 is in its L or R position. Therefore, in both of the D1 and D2 drive ranges, the one-way brake 70 provides a one-way low speed drive. Ordinarily, therefore, the shift from low to second speed drive is caused by the engagement of only one friction engaging device, namely, the brake 34, and the one-way brake 70 automatically releases when the brake 34 engages sufficiently to take the drive. The change from low speed drive to second speed drive is thus quite smooth. The transition valve, on the other hand, when the manual valve 102 is in its L or R position, allows engagement of the brake 35 so that a two-way low speed drive is provided through the transmission suitable for descending steep grades with the vehicle.

The reverse inhibitor valve 115 advantageously prevents a completion of the reverse drive until the speed of the vehicle, when travelling in the forward direction, decreases to a certain value. Breakage of any transmission parts due to a change into reverse drive when travelling at a high forward speed is thus prevented. The reverse inhibitor valve functions, in addition, to automatically shift the transmission into low range if the manual valve 102 is put into its R position, it being assumed that the vehicle operator really wished low range drive when the manual valve 102 is put into its R position above a predetermined vehicle speed in the forward direction. The inhibitor valve 115 furthermore automatically changes the drive into reverse when the vehicle speed in the forward direction finally reduces below the predetermined vehicle speed. The governor safety valve 112 operates in conjunction with the reverse inhibitor valve 115 to prevent any possible shifting of the reverse inhibitor valve 115 into its low range position when the vehicle is travelling in the reverse direction.

I wish it to be understood that the invention is not to be limited to the specific constructions and arrangements shown and described, except only insofar as the claims may be so limited, as it will be understood to those skilled in the art that changes may be made without departing from the principles of the invention.

I claim:
1. In transmission mechanism, the combination of a drive shaft, a driven shaft, means for providing a forward drive power train between said shafts, means for providing a reverse drive power train between said shafts, a manual selector having a reverse drive position, selector controlled means for rendering said reverse drive power train effective when said selector is in its reverse drive position, overruling means for said selector controlled means for rendering said reverse drive power train ineffective, forward drive control means for at times rendering said forward drive power train effective, means controlled by said overruling means for rendering said forward drive effective, and speed responsive means effective on both said overruling means and said forward drive control means to render said reverse drive power train ineffective with said selector being in its reverse drive position and for rendering said forward drive power train effective in lieu of the reverse drive power train.

2. In transmission mechanism, the combination of a drive shaft, a driven shaft, means for providing a forward drive power train between said shafts, means for providing a reverse drive power train between said shafts, a manual selector having a forward drive position and a reverse drive position, reverse drive selector controlled means for rendering said reverse drive power train effective when said selector is in its reverse drive position, forward drive selector controlled means for rendering said forward drive power train effective when said selector is in its forward drive position, overruling means for said reverse drive selector controlled means for rendering said reverse drive power train ineffective, forward drive control means for at times rendering said forward drive power train effective, means controlled by said overruling means for rendering said forward drive effective, and means under the control of the speed of said driven shaft and effective on both said overruling means and said forward drive control means to render said reverse drive power train ineffective with said selector being in its reverse drive position and for rendering said forward drive power train effective in lieu of the reverse drive power train both when the speed of said driven shaft is above a predetermined speed.

3. In transmission mechanism, the combination of a drive shaft, a driven shaft, means for providing a forward drive power train between said shafts, means for providing a reverse drive power train between said shafts, a manual selector having a neutral position in which all power trains are broken through the transmission mechanism and having a forward drive position and a reverse drive position, selector controlled means for rendering said reverse drive effective when said selector is in its reverse drive position, selector controlled means for rendering said forward drive power train effective when said selector is in its forward drive position, said forward drive and reverse drive positions being located on the same side of said neutral position, a device having two positions in the first one of which it effectively disconnects said reverse drive selector controlled means and said selector for maintaining said reverse drive ineffective and in which it renders said forward drive power train effective and having a second position in which it completes said connection between said selector and said reverse drive selector controlled means, connecting means controlled by said device for rendering said forward drive effective, and means responsive to the speed of said driven shaft and effective on said device to move it from its said second position to its said first position above a predetermined speed of said driven shaft so that said forward drive power train is completed in lieu of said reverse drive power train with said selector being in its reverse drive position.

4. In transmission mechanism, the combination of a drive shaft, a driven shaft, means for providing low and intermediate high speed forward drive power trains between said shafts, means for providing a reverse drive power train between said shafts, a manual selector having a drive range and a low range and a reverse drive and a neutral position, means under the control of said selector for rendering effective at least said intermediate and high speed forward drives when said selector is in its drive range position, means under the control of said selector for rendering effective said low and intermediate speed drives when said selector is in its low range position, means under the control of said selector for rendering effective said reverse drive power train when said selector is in its reverse drive position, an overruling mechanism having two conditions in a first one of which it renders said low range drives effective and renders said reverse drive ineffective and the second of which it allows said reverse drive to be effective when said selector is in its reverse drive position, connecting means controlled by said overruling mechanism for rendering said low range drive effective, and means controlled by the speed of said driven shaft for actuating said overruling mechanism to its first condition when said driven shaft is rotating above a predetermined speed.

5. In a transmission mechanism, the combination of a drive shaft, a driven shaft, means for providing low and intermediate and high speed forward drive power trains between said shafts, means for providing a reverse drive power train between said shafts, a manual selector having a neutral position and a drive range position adjacent thereto and a low range position adjacent to said drive range position and remote from its said neutral position and a reverse drive position adjacent said low range position and remote from said neutral position, a governor responsive to the speed of said driven shaft, means for automatically shifting said transmission mechanism between its intermediate and high speed drive positions under the control of said governor when said selector is in its drive range position, means for automatically shifting said transmission mechanism from its intermediate speed drive to its low speed drive under the control of said governor when said selector is in its low range position, means for completing said reverse drive power train when said selector is in its reverse drive position, overruling mechanism having two conditions in a first one of which it renders said low range drives effective and renders said reverse drive ineffective and in the second of which it renders said reverse drive effective when said selector is in its reverse drive position, connecting means connected with said overruling mechanism for rendering said low range drives effective, and means connecting said governor and said overruling mechanism for putting the overruling mechanism in its said first condition when said driven shaft is rotating above a predetermined speed.

6. In transmission mechanism, the combination of a drive shaft, a driven shaft, hydraulically actuated means for providing relatively low and high forward drive power trains between said shafts, hydraulically actuated means for providing a reverse drive power train between said shafts, a manual selector valve having a forward drive position and a reverse drive position, a hydraulic governor driven by said driven shaft and providing a governor output pressure that increases with driven shaft speed, means under the control of said selector valve for rendering effective said forward drive power trains when said valve is in its forward drive position and causing a change from said high speed power train to said low speed power train under the control of said governor as said driven shaft decreases in speed, means under the control of said selector valve for hydraulically completing a conduit for fluid pressure for rendering effective said reverse drive power train when the selector is in its reverse drive position, and a blocking valve having a first position in which it blocks said conduit and also provides a source of hydraulic pressure to said hydraulically actuated means providing low and high power trains and in the other of which positions it hydraulically completes said conduit so that said reverse drive power train is made effective when said selector valve is in its reverse drive position, conduit means connecting said valve with said means for rendering effective said forward drive power trains, and means connecting said governor and said blocking valve whereby the blocking valve is held in its said first position above a predetermined speed of said driven shaft so that a forward drive power train is effective rather than a reverse drive power train when said selector valve is in its reverse drive position above said predetermined driven shaft speed.

7. In transmission mechanism, the combination of a drive shaft, a driven shaft, means for providing relatively low and high speed forward drive power trains between said shafts, means for providing a reverse drive power train between said shafts, means for changing the drive between said forward drive power trains under the control of said driven shaft and including a hydraulic governor driven by said driven shaft and providing an output hydraulic pressure in a governor conduit that varies with driven shaft speed, and a fluid pressure actuated valve under the control of said reverse drive means for exhausting said conduit so as to assure that no hydraulic governor pressure exists when said reverse drive is made effective between said shafts.

8. In transmission mechanism, the combination of a drive shaft, a driven shaft, means for providing two different forward drive power trains between said shafts, means for providing a reverse drive power train between said shafts, means for changing from one of said forward drive power trains to the other and including a hydraulic control governor providing a hydraulic pressure in a governor output conduit that changes with driven shaft speed, a valve under the control of the governor output pressure for changing the drive from one of said forward drive power trains to said reverse drive, and means under the control of said reverse drive power train providing means for exhausting said conduit for assuring that said valve cannot be shifted under any governor output pressure when reverse drive is effective.

9. In transmission mechanism, the combination of a drive shaft, a driven shaft, means for providing two different forward drive power trains between said shafts, one of said power trains including a one-way device for rendering the train effective for a drive from said drive shaft to said driven shaft and also including a friction engaging device for rendering the drive effective in the opposite direction, a selector having two drive positions, a governor for causing changes between said two power trains in both positions of said selector, and means for preventing engagement of said friction device, said means being interposed between said selector and said friction engaging means so as to be actuated in one of the positions of the selector and released in the other position of the selector.

10. In transmission mechanism, the combination of a drive shaft, a driven shaft, means for providing a power train between said shafts, said power train including a single one-way device for rendering the train effective for a drive from said drive shaft to said driven shaft and including a friction engaging device for rendering the drive effective in the opposite direction, a manually operated selector having two drive positions, and means for preventing engagement of said friction device, said means being interposed between said selector and said friction engaging means so as to be actuated in one of the positions of the selector and released in the other position of the selector.

11. In transmission mechanism, the combination of a drive shaft, a driven shaft, means for providing a power train between said shafts, said power train including a one-way device for rendering the train effective for a drive from said drive shaft to said driven shaft and also including a fluid pressure engaged friction engaging device for rendering the drive effective in the opposite direction, a selector valve having two drive positions, a source of fluid pressure, a valve for blocking said friction engaging device with respect to said source of fluid pressure, said selector valve being connected with said blocking valve so as to apply fluid pressure in one position of the selector valve to said blocking valve from said pressure source so that in one position of the selector valve the blocking valve is effective and in the other position of the selector valve the blocking valve is ineffective.

12. In transmission mechanism, the combination of a drive shaft, a driven shaft, means for providing two different forward drive power trains between said shafts, one of said power trains including a one-way device for rendering the train effective for a drive from said drive shaft to said driven shaft and also including a fluid pressure actuated friction engaging device for rendering the drive effective in the opposite direction, a selector valve having two drive positions, a governor for causing changes between said two power trains in both positions of said selector valve, a source of fluid pressure connectible with said friction device, and a blocking valve under the control of said selector valve for blocking said pressure source with respect to said friction engaging device in one position of the selector valve but allowing connection between the pressure source and the friction device in the other position of the selector.

13. In transmission mechanism, the combination of a drive shaft, a driven shaft, means for providing two different forward drive power trains between said shafts, one of said power trains including a one-way device for rendering the train effective for a drive from said drive shaft to said driven shaft and also including a fluid pressure engaged friction engaging device for rendering the drive effective in the opposite direction, a selector valve having two drive positions, a source of fluid pressure, a ratio changing valve for applying and disapplying pressure from said source to said friction device for causing changes between said two power trains, a governor driven by one of said shafts and connected with said pressure source for supplying a governor pressure effective on said valve for causing it to shift, a blocking valve connected with said friction device for either blocking fluid pressure application to said device or permitting such application in different positions of the blocking valve, and a selector valve connected with said pressure source for selectively applying fluid on said blocking valve for moving it between its positions.

References Cited in the file of this patent

UNITED STATES PATENTS

| | | |
|---|---|---|
| 2,645,137 | Roche | July 14, 1953 |
| 2,734,399 | Christenson | Feb. 14, 1956 |
| 2,815,684 | Roche | Dec. 10, 1957 |
| 2,873,618 | De Lorean | Feb. 17, 1959 |
| 2,895,344 | Holdeman et al. | July 21, 1959 |